US012730541B2

(12) United States Patent
Mizuhashi et al.

(10) Patent No.: US 12,730,541 B2
(45) Date of Patent: Sep. 8, 2026

(54) SENSOR AND POSITION DETECTION APPARATUS

(71) Applicant: Wacom Co., Ltd., Saitama (JP)

(72) Inventors: Hiroshi Mizuhashi, Saitama (JP); Fumitaka Goto, Saitama (JP); Joo Hoon Lee, Saitama (JP); Hayato Kurasawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/292,164

(22) Filed: Aug. 6, 2025

(65) Prior Publication Data

US 2025/0355527 A1 Nov. 20, 2025

Related U.S. Application Data

(63) Continuation of application No. PCT/JP2024/023084, filed on Jun. 26, 2024.

(Continued)

(30) Foreign Application Priority Data

Nov. 23, 2023 (JP) ................................ 2023-198704

(51) Int. Cl.

*G06F 3/046* (2006.01)
*G06F 3/044* (2006.01)

(52) U.S. Cl.

CPC .......... *G06F 3/0442* (2019.05); *G06F 3/0446* (2019.05); *G06F 3/0448* (2019.05); *G06F 3/046* (2013.01); *G06F 2203/04113* (2013.01)

(58) Field of Classification Search

CPC .... G06F 3/04164; G06F 3/0445; G06F 3/046; G06F 3/04166; G06F 3/0448;

(Continued)

(56) References Cited

U.S. PATENT DOCUMENTS

2017/0024037 A1 1/2017 Ishizaki et al.
2018/0260061 A1 9/2018 Hirota (Continued)

FOREIGN PATENT DOCUMENTS

JP H07295729 A 11/1995
JP 2000099259 A 4/2000

(Continued)

OTHER PUBLICATIONS

International Search Report, mailed Aug. 13, 2024, for International Application No. PCT/JP2024/023084. (4 pages).

(Continued)

*Primary Examiner* — Deeprose Subedi
(74) *Attorney, Agent, or Firm* — Seed Intellectual Property Law Group LLP

(57) ABSTRACT

A sensor is provided, which includes an on-cell mutual-capacitance touch sensor and a RX electrode layer (RX sensor coil group) including a plurality of RX electrodes that detect a pen alternating magnetic field generated by a pen, which has accumulated energy through an alternating magnetic field from a TX electrode layer (TX sensor coil group). The TX electrode generates the alternating magnetic field for detecting a position of the pen by using an electromagnetic induction effect. In the RX electrode layer (RX sensor coil group), floating patterns, which are surrounded by touch electrodes formed by a mesh electrode pattern provided in an on-cell touch layer of the on-cell mutual-capacitance touch sensor and which are adjacent to one another in an extension direction of the RX electrodes, are connected to one another by jumper wires to linearly form RX electrode wires.

9 Claims, 21 Drawing Sheets

Related U.S. Application Data

(60) Provisional application No. 63/517,550, filed on Aug. 3, 2023, provisional application No. 63/510,440, filed on Jun. 27, 2023.

(58) Field of Classification Search
CPC ........ G06F 3/044; G06F 3/041; G06F 3/0442; G06F 3/0446; G06F 2203/04106; G06F 2203/04113; G06F 2203/04112
See application file for complete search history.

(56) References Cited

U.S. PATENT DOCUMENTS

| | | | |
|---|---|---|---|
| 2020/0225773 A1 | 7/2020 | Yamamoto et al. | |
| 2021/0208709 A1 | 7/2021 | Shin et al. | |
| 2022/0091632 A1 | 3/2022 | Hong et al. | |
| 2022/0107703 A1 | 4/2022 | Lee et al. | |
| 2023/0071229 A1 | 3/2023 | Lee et al. | |
| 2025/0264946 A1 * | 8/2025 | Moon | G06F 3/046 |

FOREIGN PATENT DOCUMENTS

| | | | |
|---|---|---|---|
| JP | 2002244806 | A | 8/2002 |
| JP | 2007157107 | A | 6/2007 |
| JP | 2012133704 | A | 7/2012 |
| JP | 2014035631 | A | 2/2014 |
| JP | 2018147348 | A | 9/2018 |
| JP | 2018185559 | A | 11/2018 |
| JP | 2019091291 | A | 6/2019 |
| JP | 2019121330 | A | 7/2019 |
| JP | 6612075 | B2 | 11/2019 |
| JP | 2021103459 | A | 7/2021 |
| JP | 2021157849 | A | 10/2021 |
| JP | 2021168204 | A | 10/2021 |
| JP | 2021193625 | A | 12/2021 |
| JP | 2022012385 | A | 1/2022 |
| KR | 1020140003067 | A | 1/2014 |
| KR | 1020220096768 | A | 7/2022 |
| KR | 1020230041449 | A | 3/2023 |
| WO | 2020202352 | A1 | 10/2020 |

OTHER PUBLICATIONS

Written Opinion of the International Searching Authority, mailed Aug. 13, 2024, for International Application No. PCT/JP2024/023084. (6 pages).

International Search Report, mailed Sep. 10, 2024, for corresponding International Application No. PCT/JP2024/023263. (5 pages)(with Translation).

International Search Report, mailed Sep. 17, 2024, for corresponding International Application No. PCT/JP2024/023181. (7 pages)(with Translation).

Notice of Reasons for Refusal, mailed Jan. 28, 2025, for corresponding Japanese Patent Application No. 2024-559116. (12 pages)(with Translation).

* cited by examiner

FIG. 1
Touch sensor TS
Display Front Panel 301
TFT Back Panel 302
FIG. 2
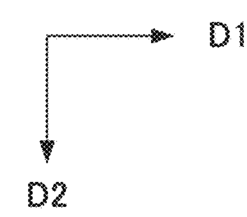
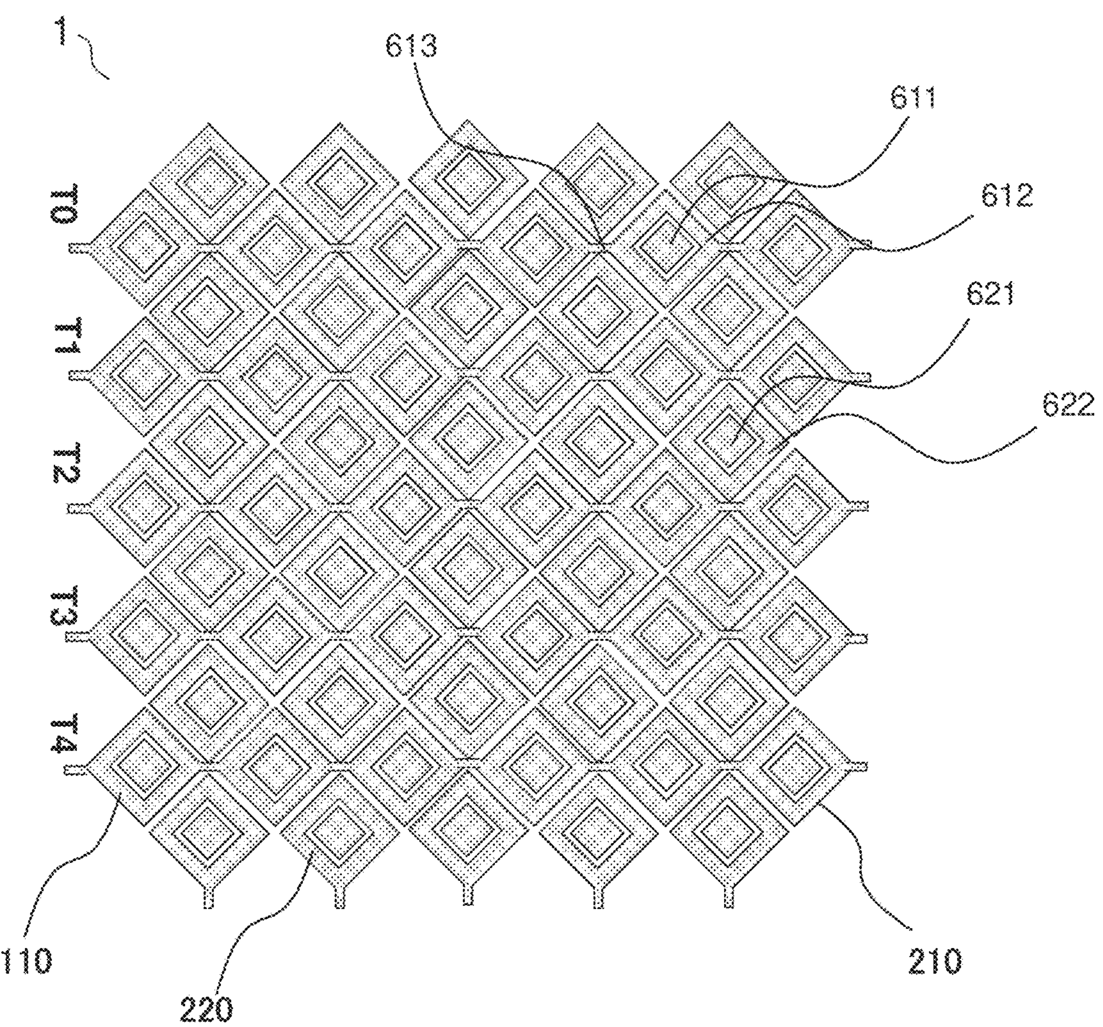

1
10
Tx
11
T0
T1
T2
T3
T4
TR0
TR1
TR2
TR3
TR4
20
RX data
(2D heatmap (capacitive coupling))

130
T0
T1
T2
T3
T4
T5
T6
T7
T8
T9
T10
T11
T12
T13
T14
T15
AA
100
120
121
125
126
127
128
129
135
11
TX Circuit 10
Tx
Tx_inv

| | X0 | X1 | X2 | X3 | X4 |
|---|---|---|---|---|---|
| Y0 | 19 | 22 | 34 | 37 | 44 |
| Y1 | 33 | 105 | 118 | 121 | 110 |
| Y2 | 25 | 100 | 249 | 187 | 99 |
| Y3 | 38 | 112 | 192 | 208 | 144 |
| Y4 | 40 | 113 | 107 | 168 | 120 |

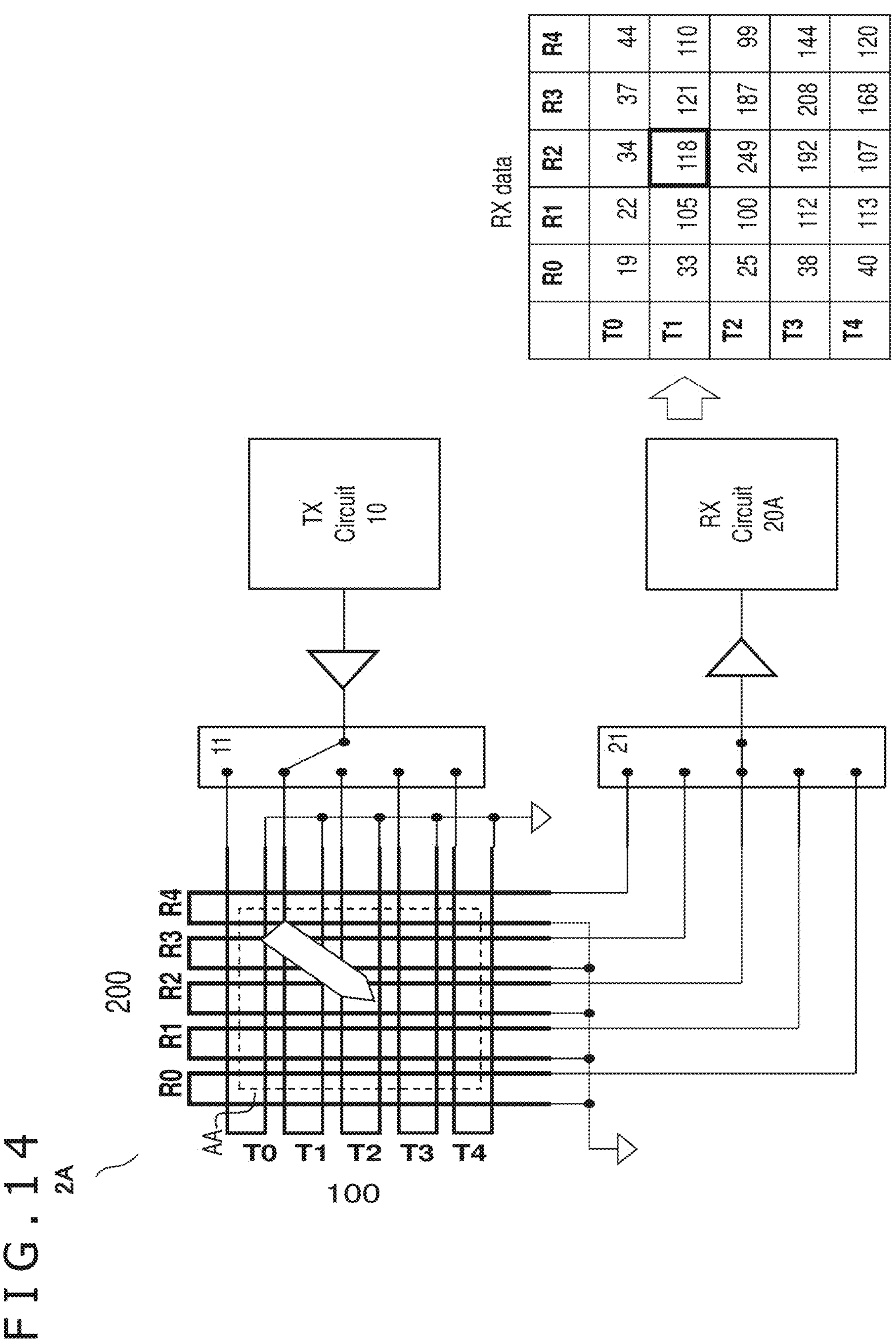
| | R0 | R1 | R2 | R3 | R4 |
|---|---|---|---|---|---|
| T0 | 19 | 22 | 34 | 37 | 44 |
| T1 | 33 | 105 | 118 | 121 | 110 |
| T2 | 25 | 100 | 249 | 187 | 99 |
| T3 | 38 | 112 | 192 | 208 | 144 |
| T4 | 40 | 113 | 107 | 168 | 120 |

135
T15
T14
T13
T12
T11
T10
T9
T8
T7
T6
T5
T4
T3
T2
T1
T0
130
100
129
128
127
126
125
121
140
AA
120

100
100-1
100-2
100-3
400
131
130
135
120
121
125
126
127
128
129
140
140-1
140-2
AA
T0
T1
T2
T3
T4
T5
T6
T7
T8
T9
T10
T11
T12
T13
T14
T15

X sensor coil(s)
X0
X1
X2
X3
X4
AA
Y0
Y1
Y2
Y3
Y4
Y sensor coil(s)
MUX
MUX
TX
RX
TX
RX
Y-axis TX/RX circuit
X-axis TX/RX circuit
RX data
Y0 34
Y1 118
Y2 249
Y3 192
Y4 107
RX data
X0 25
X1 100
X2 249
X3 187
X4 99

SENSOR AND POSITION DETECTION APPARATUS

BACKGROUND OF THE INVENTION

1. Field of the Invention

The present invention relates to a sensor and a position detection apparatus.

2. Description of the Related Art

In recent years, a position input apparatus based on an electromagnetic induction system is used as an input device of a tablet personal computer (PC), for example.

The position input apparatus includes a pen-shaped position indicator (pen-type position indicator) and a position detection apparatus including an input surface used with the pen-type position indicator to perform a pointing operation or to input character or figures.

The position indicator includes a resonant circuit including a coil and a capacitor.

Meanwhile, to obtain coordinates in an X-axis direction of the position indicator in an active area AA as illustrated in FIG. 20, the position detection apparatus includes:

- an X sensor coil group including X sensor coils X0, . . . , and X4 lined up in the X-axis direction;
- a switch connected to the X sensor coil group; and
- an X-axis transmission/reception (TX/RX) circuit configured to
  - apply, in a transmission period, a current to each coil of the X sensor coil group lined up on the X-axis to generate an alternating magnetic field (hereinafter, transmission magnetic field), and
  - acquire, in a detection period after the transmission period, a current or a voltage to detect electromotive force generated in each coil of the X sensor coil group through a pen signal (hereinafter, alternating magnetic field generated by the circuit of the position indicator), wherein the electromotive force is continuously generated from the position indicator that has accumulated energy in the resonant circuit in the transmission period even after the transmission period.

Similarly, to obtain coordinates in a Y-axis direction of the position indicator, the position detection apparatus includes:

- a Y sensor coil group including Y sensor coils Y0, . . . , and Y4 lined up in the Y-axis direction;
- a switch connected to the Y sensor coil group; and
- a Y-axis TX/RX circuit configured to
  - apply, in the transmission period, a current to each coil of the Y sensor coil group lined up on the Y-axis to generate a transmission magnetic field, and
  - acquire, in the detection period after the transmission period, a current or a voltage to detect electromotive force generated in each coil of the Y sensor coil group through a pen signal, wherein the electromotive force is continuously generated from the position indicator that has accumulated energy in the resonant circuit in the transmission period even after the transmission period.

The position detection apparatus selects one sensor coil in a predetermined order from the plurality of sensor coils included in a position detection sensor and transmits a transmission signal from the selected sensor coil to the position indicator to charge the capacitor in the position indicator, for example.

Also, the position detection apparatus connects the sensor coil used for the transmission to a reception circuit and receives a signal transmitted from the resonant circuit of the position indicator.

The position detection apparatus sequentially switches the sensor coils and transmit and receive the signals to thereby detect the position of the position indicator on the position detection apparatus.

The position detection of the position indicator in the position detection apparatus will be described in detail. (1) To detect the whereabouts of the position indicator on the position detection sensor, the position detection apparatus performs a global scan for sequentially switching all of the sensor coils to detect the indicated position of the position indicator and specifies the approximate position on the position detection sensor. (2) The position detection apparatus performs a sector scan for sequentially selecting only a predetermined number of sensor coils near the specified approximate position and transmitting and receiving signals, to accurately specify the indicated position of the position indicator.

In the example of FIG. 20, the position detection apparatus uses interpolation calculation or the like to derive the coordinates in the Y-axis direction of the position indicator from a distribution of level values in one axial direction, such as a level value of 34 obtained at the Y sensor coil Y0, a level value of 118 obtained at the Y sensor coil Y1, . . . , and a level value of 107 obtained at the Y sensor coil Y4, as illustrated in RXdata (upper part) of FIG. 20.

Similarly, the position detection apparatus uses interpolation calculation or the like to derive the coordinates in the X-axis direction of the position indicator from a distribution of level values in one axial direction, such as a level value of 25 obtained at the X sensor coil X0, a level value of 100 obtained at the X sensor coil X1, . . . , and a level value of 99 obtained at the X sensor coil X4, as illustrated in RXdata (lower part) of FIG. 20.

In this way, to obtain the two-dimensional coordinates of the position indicator, the position detection apparatus of FIG. 20 separately acquires the levels on two axes and obtains the coordinates of each dimension with respect to each of the X- and Y-axes from each distribution (RXdata) of the levels. The position detection apparatus combines the two sets of coordinates and applies certain processing to the coordinates to output the two-dimensional coordinates.

A stack configuration, in which the above position detection apparatus is combined with (or incorporated in) a touch sensor, which detects a finger or the like on the basis of a capacitance (self-capacitance or mutual capacitance) system, and a display apparatus, includes a display 300 (including a display front plane 301 and a thin-film transistor (TFT) back plane 302) and an electromagnetic resonance (EMR) sensor including a TX sensor coil group 100 and an RX sensor coil group 200 provided below the display 300 through a glue layer (Glue), as illustrated in FIG. 21.

A touch sensor is further provided above the display 300, and a cover glass (including a case of a cover film) where the pen comes into contact is provided above the touch sensor (for example, see Japanese Patent Laid-Open No. 2007-157107).

However, the touch sensor, the display 300, and the EMR sensor (including the TX sensor coil group 100 and the RX sensor coil group 200) are provided in different substrates (different layers) in the conventional position detection apparatus described in Japanese Patent Laid-Open No.

2007-157107. This increases the thickness of the stack structure in which they are attached by glue layers, and this also degrades the design.

SUMMARY OF THE INVENTION

The present invention has been made in view of the problems, and according to one aspect, a sensor is provided that reduces the thickness of the stack structure and improves the design while maintaining the performance of the position detection apparatus that includes the sensor.

First Aspect: One or more embodiments of the present disclosure propose a sensor including an on-cell mutual-capacitance touch sensor and an RX electrode layer. The RX electrode layer includes a plurality of RX electrodes that detect a pen alternating magnetic field generated by a pen that has accumulated energy through an alternating magnetic field from a TX electrode layer. The TX electrode layer includes a TX electrode that generates the alternating magnetic field for detecting a position of the pen by using an electromagnetic induction effect. In the RX electrode layer, floating patterns that are surrounded by touch electrodes formed by a mesh electrode pattern provided in an on-cell touch layer of the on-cell mutual-capacitance touch sensor and that are adjacent to one another in an extension direction of the RX electrodes are connected to one another by jumper wires to linearly form RX electrode wires.

Second Aspect: One or more embodiments of the present disclosure propose a sensor including an on-cell mutual-capacitance touch sensor and an electromagnetic induction sensor. A first electrode group included in the on-cell mutual-capacitance touch sensor and a second electrode group included in the electromagnetic induction sensor are provided in three or fewer layers including at least a layer with a mix of part of the first electrode group and part of the second electrode group.

Third Aspect: One or more embodiments of the present disclosure propose a position detection apparatus that uses an electromagnetic induction effect to detect a position of a pen. The position detection apparatus includes a TX electrode layer including a TX electrode that generates an alternating magnetic field, an RX electrode layer including a plurality of RX electrodes that detect a pen alternating magnetic field generated by the pen that has accumulated energy through the alternating magnetic field, an on-cell mutual-capacitance touch sensor, a display that controls display pixels and flickering of the display pixels, and a support plate separated from and provided below the display with respect to the pen. In the RX electrode layer, floating patterns that are surrounded by touch electrodes formed by a mesh electrode pattern provided in an on-cell touch layer of the on-cell mutual-capacitance touch sensor and that are adjacent to one another in an extension direction of the RX electrodes are connected to one another by jumper wires to linearly form the RX electrodes.

According to one or more embodiments of the present disclosure, the thickness of the stack structure can be reduced, and the design can be improved, while the performance of the position detection apparatus is maintained.

BRIEF DESCRIPTION OF THE DRAWINGS

FIG. 1 schematically depicts arrangement of a touch sensor in a sensor according to a first embodiment of the present disclosure;

FIG. 2 depicts an arrangement pattern of a mesh electrode layer on a transparent substrate of the touch sensor in the sensor according to the first embodiment of the present disclosure;

FIG. 14 is a conceptual diagram illustrating a coordinate derivation operation in a modification of a position detection apparatus according to a third embodiment of the present disclosure;

Figure 17:
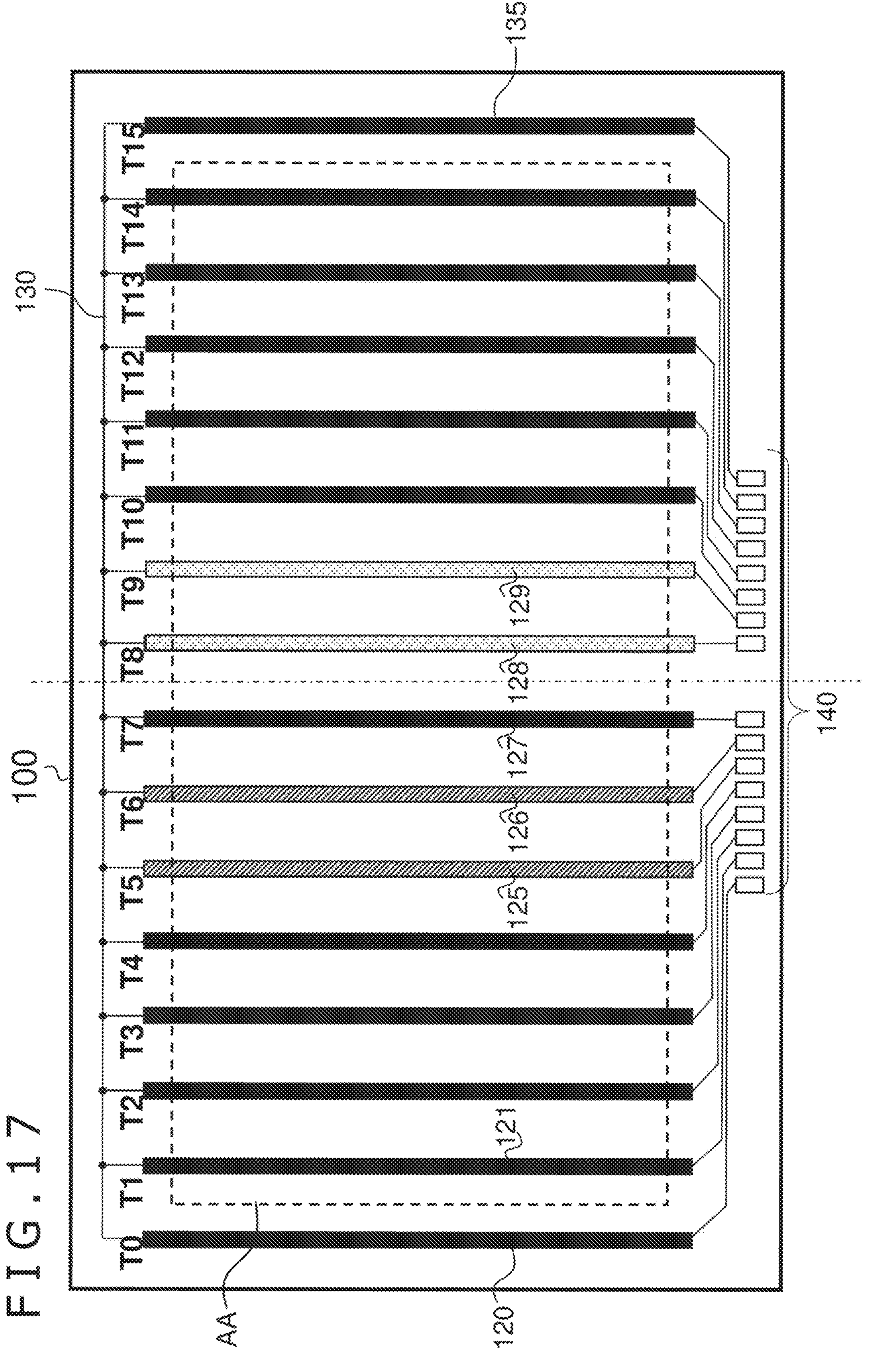
Figure 18A:
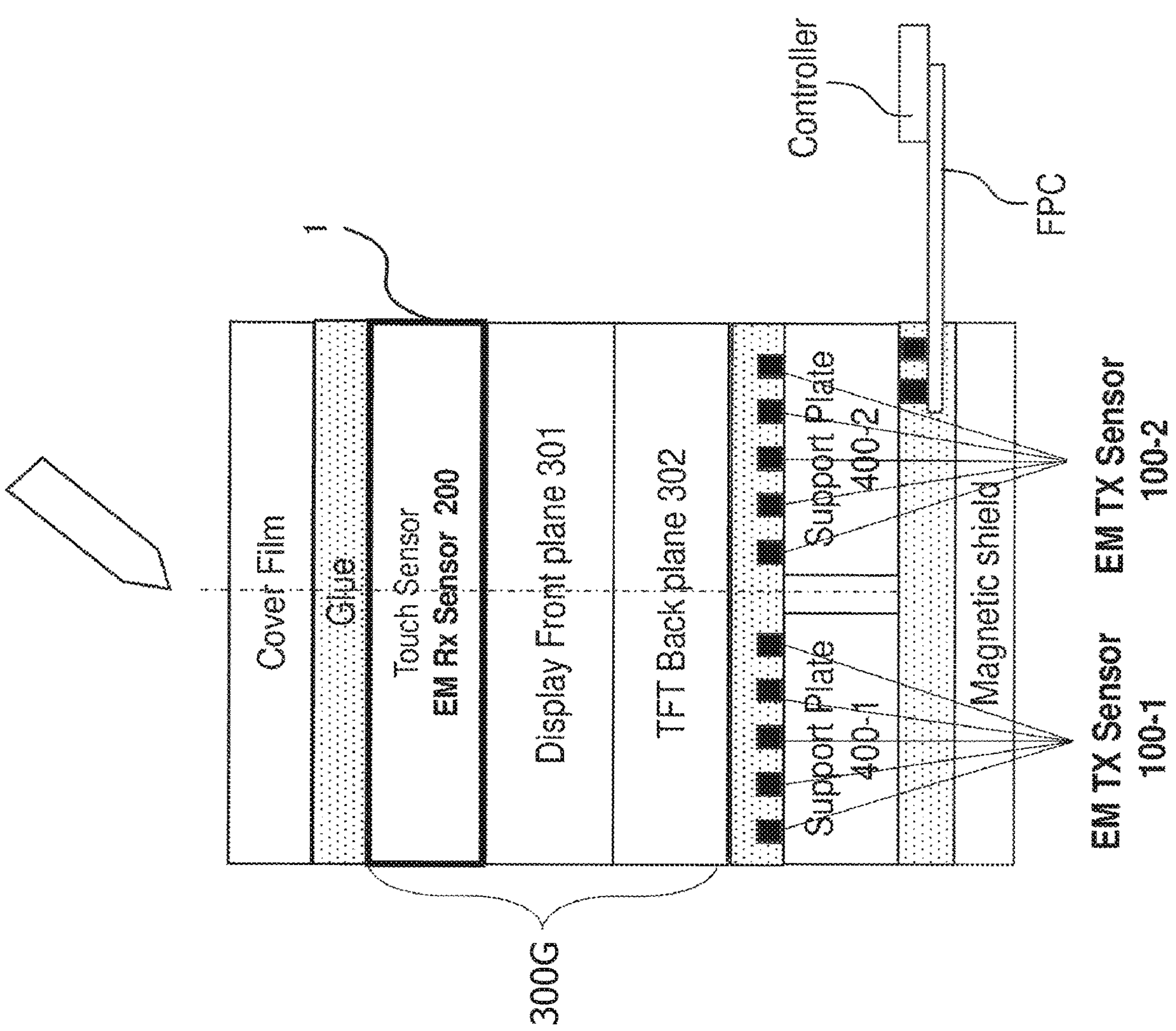
Figure 18B:
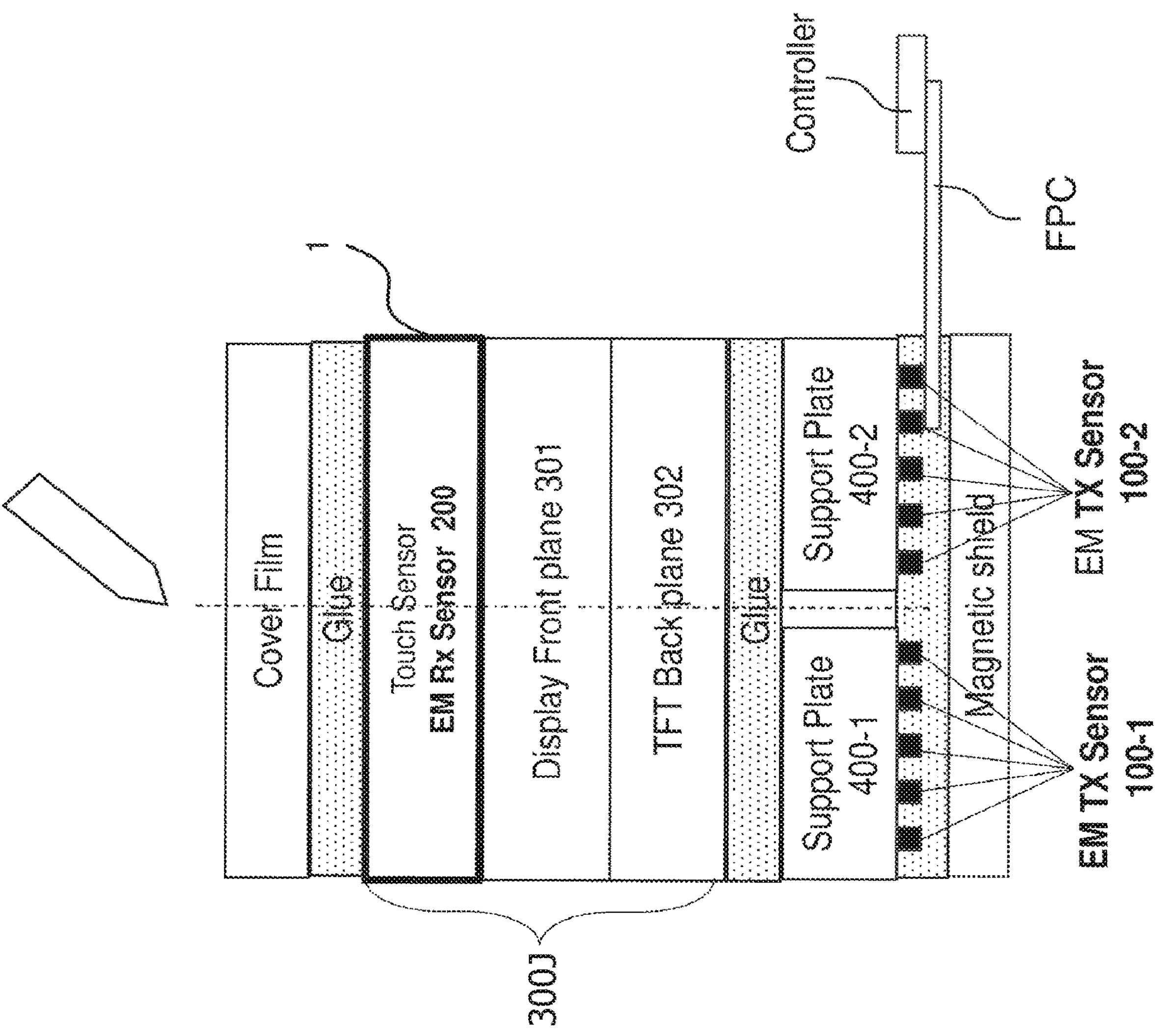
Figure 19:
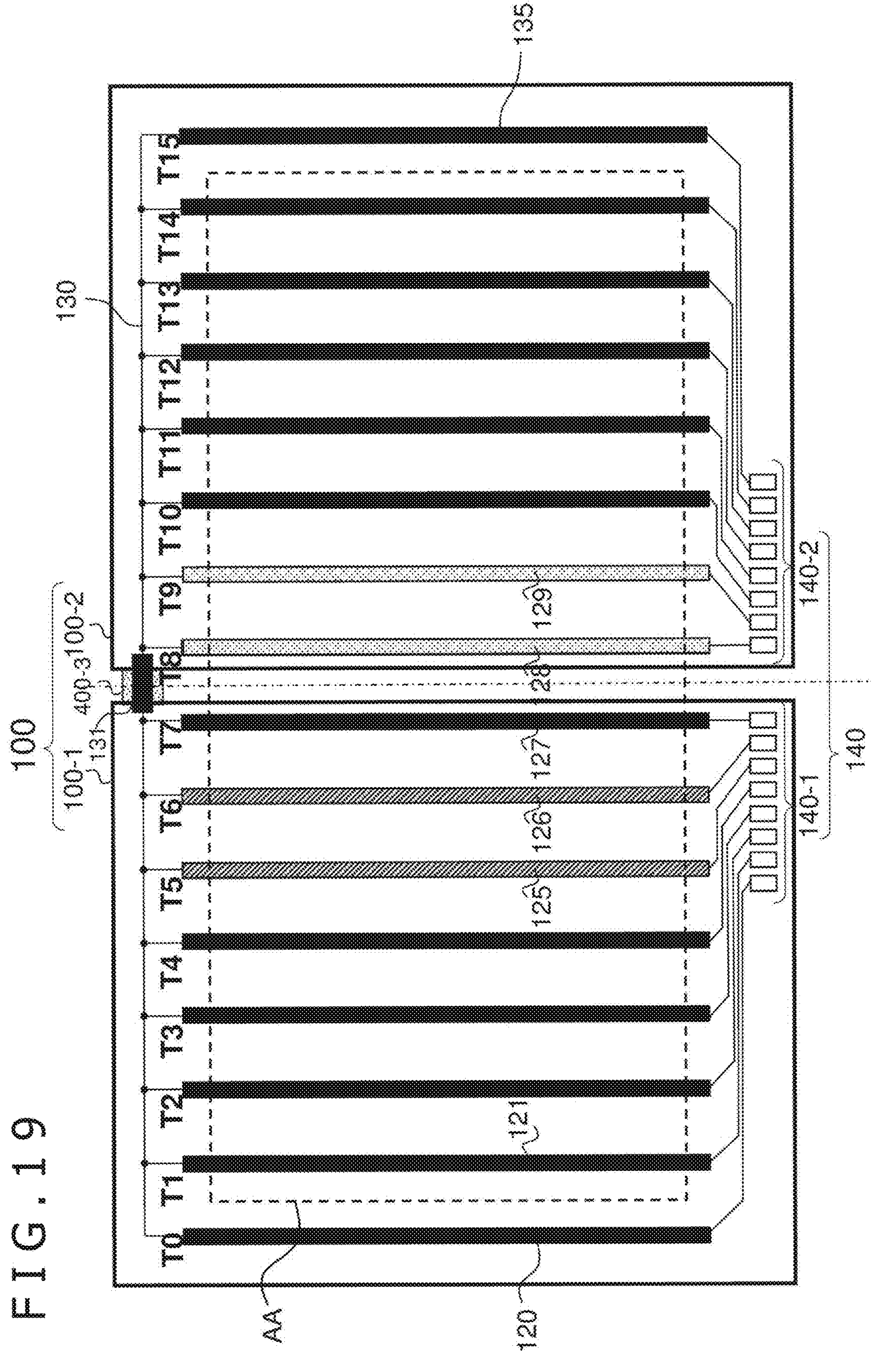
Figure 20:
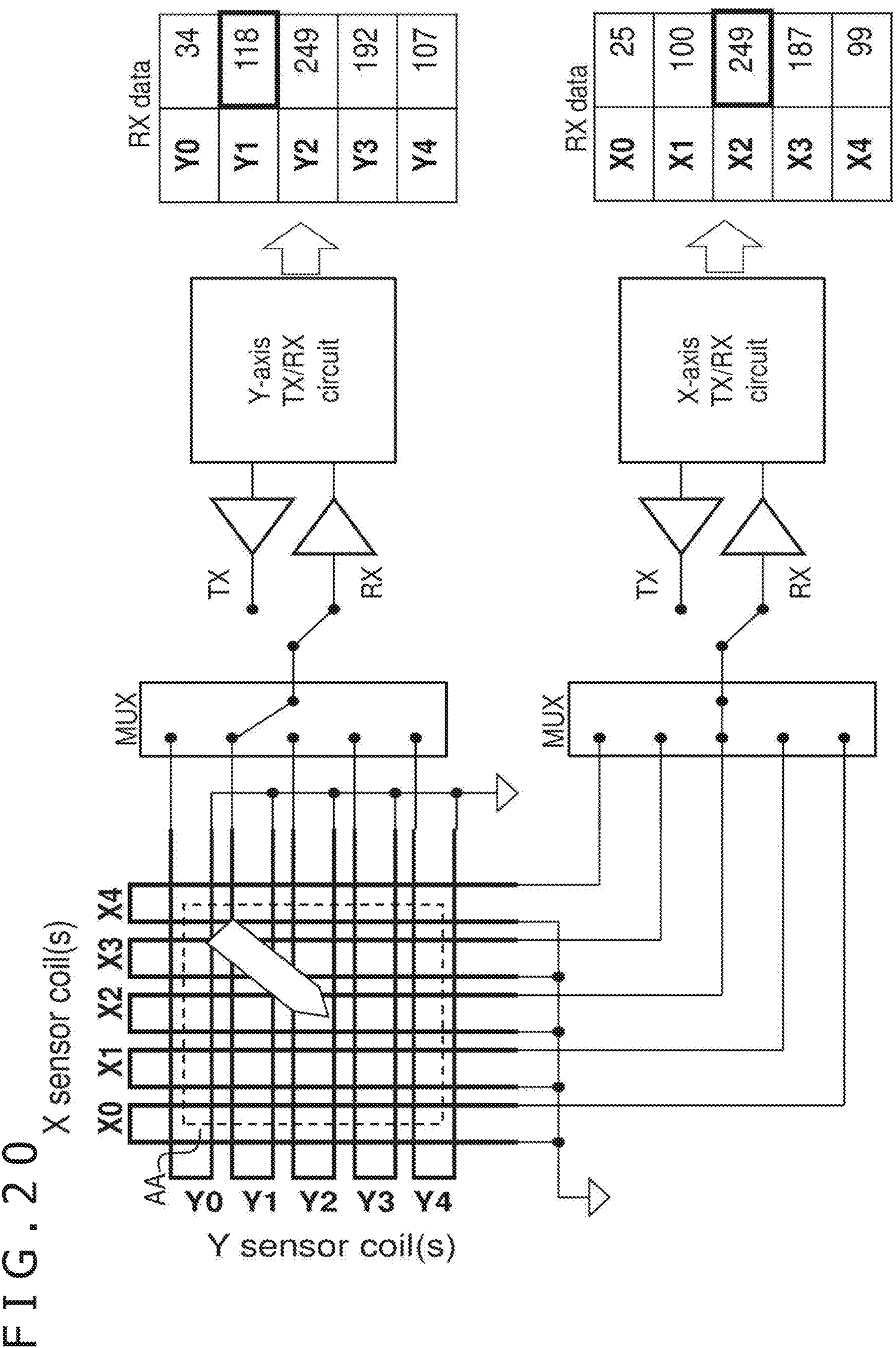
Figure 21:
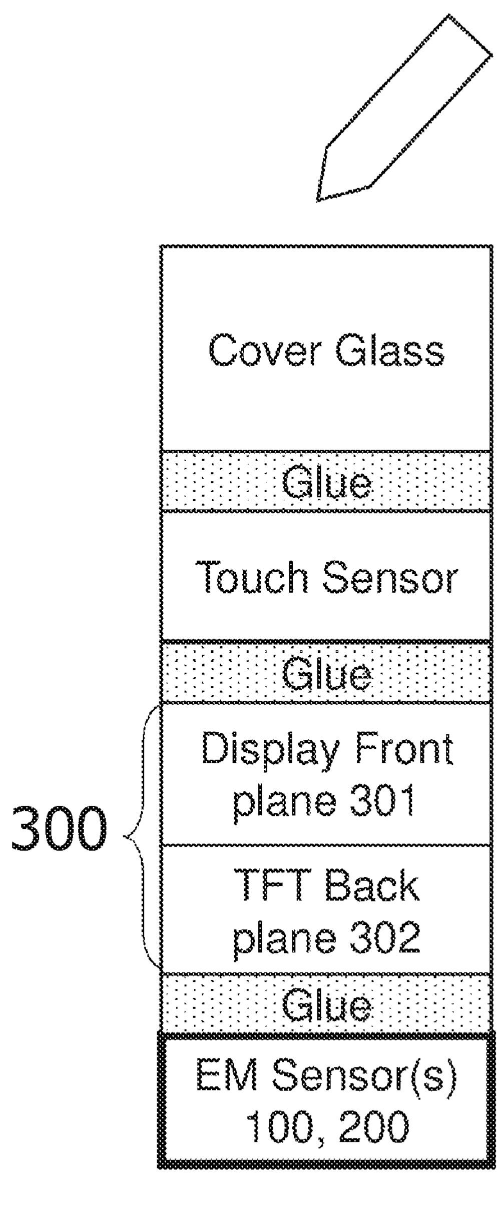

system, and the display apparatus are combined (or incorporated) according to a fourth embodiment of the present disclosure;

FIG. 17 depicts a configuration example of a TX sensor coil group in the position detection apparatus according to the fourth embodiment of the present disclosure;

FIG. 18A is a diagram illustrating an example of the stack configuration in which a position detection apparatus, the touch sensor for detecting the finger or the like on the basis of the capacitance (self-capacitance or mutual capacitance) system, and the display apparatus are combined (or incorporated) according to a fifth embodiment of the present disclosure;

FIG. 18B is a diagram illustrating an example of the stack configuration in which the position detection apparatus, the touch sensor for detecting the finger or the like on the basis of the capacitance (self-capacitance or mutual capacitance) system, and the display apparatus are combined (or incorporated) according to the fifth embodiment of the present disclosure;

FIG. 19 depicts a configuration example of the TX sensor coil group in the position detection apparatus according to the fifth embodiment of the present disclosure;

FIG. 20 is a conceptual diagram illustrating a coordinate derivation operation of a position detection apparatus according to a conventional example; and FIG. 21 is a diagram illustrating a stack configuration in which the position detection apparatus, a touch sensor for detecting a finger or the like on the basis of the capacitance (self-capacitance or mutual capacitance) system, and a display apparatus are combined (or incorporated) according to the conventional example.

DETAILED DESCRIPTION OF THE PREFERRED EMBODIMENTS

Embodiments of the present disclosure will be described below with reference to FIGS. 1 to 19.

First Embodiment

A sensor 1 according to a first embodiment will be described with reference to FIGS. 1 to 7.

<Configuration of Sensor 1>

As illustrated in FIGS. 1 to 4, the sensor 1 according to the present embodiment includes an on-cell mutual-capacitance touch sensor TS1 and an RX electrode layer (RX sensor coil group 200) for detecting the position of a pen by using an electromagnetic induction effect.

As illustrated in FIG. 1, the on-cell mutual-capacitance touch sensor TS1 is an integrated sensor (integrated/universal sensor module) provided on a display front plane 301 stacked on a TFT back plane 302.

The on-cell mutual-capacitance touch sensor TS1 is, for example, provided between the display front plane 301 and an unillustrated glass substrate, which is provided above the display front plane 301 and includes a polarizing plate and a color filter.

The on-cell mutual-capacitance touch sensor TS1 is, for example, a mutual-capacitance touch sensor.

The RX electrode layer (RX sensor coil group 200) is a sensor that detects a pen alternating magnetic field generated by the pen that has accumulated energy through an alternating magnetic field from a TX electrode layer. The TX electrode layer is provided with TX electrodes that generate the alternating magnetic field for detecting the position of the pen by using the electromagnetic induction effect. A plurality of RX electrodes are arranged in the RX electrode layer (RX sensor coil group 200).

Note that the detailed configuration of the RX electrode layer (RX sensor coil group 200) for detecting the position of the pen by using the electromagnetic induction effect will be described later.

Figure 4:
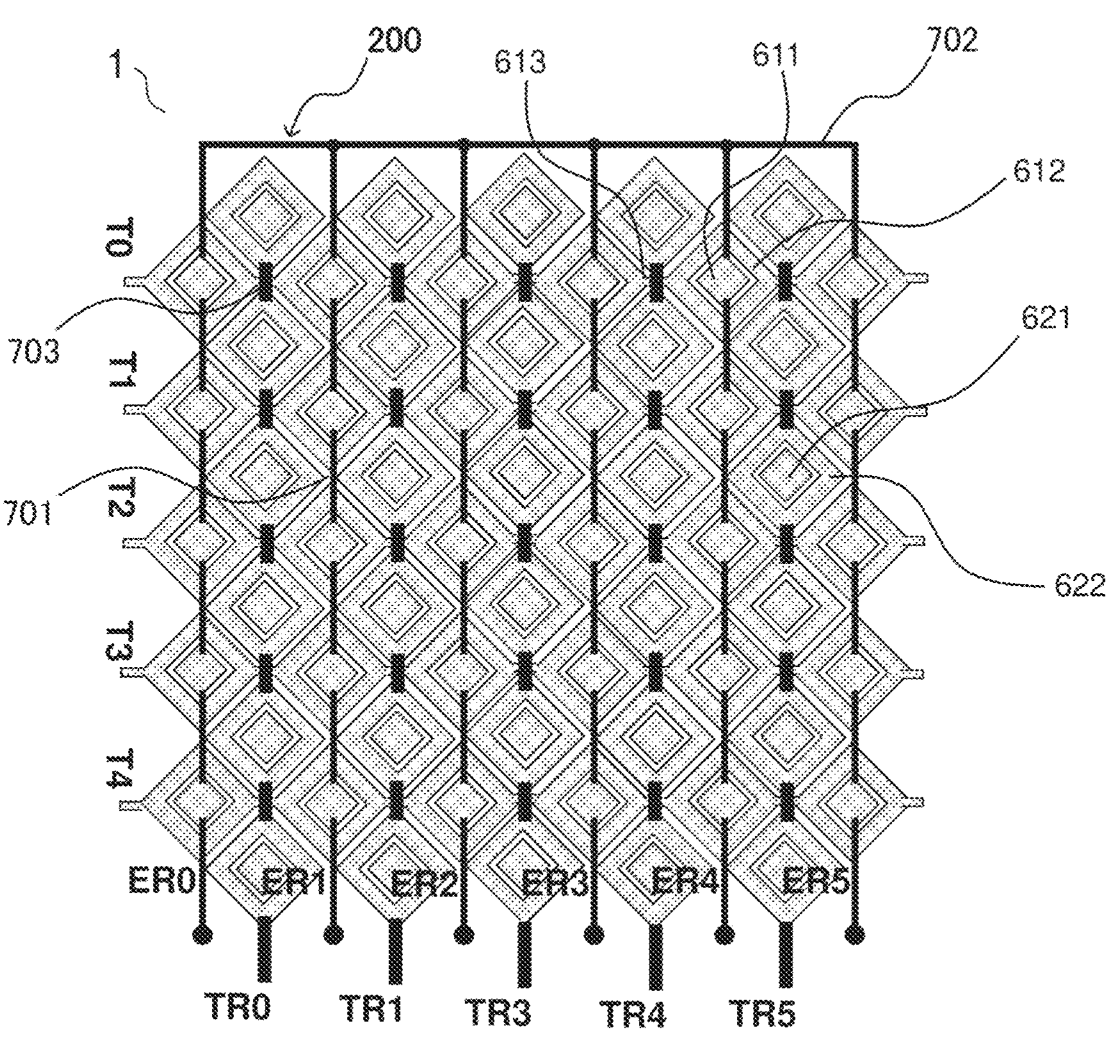
FIG. 4 is a superimposed diagram of the mesh electrode layer of FIG. 2 and the jumper wires of FIG. 3 in the sensor according to the first embodiment of the present disclosure.

The sensor 1 according to the present embodiment is formed by, for example, integrating the RX electrode layer (RX sensor coil group 200) for detecting the position of the pen by using the electromagnetic induction effect, into a mesh electrode pattern provided in an on-cell touch layer of the on-cell mutual-capacitance touch sensor TS1, as illustrated in FIG. 4.

<Configuration of On-Cell Mutual-Capacitance Touch Sensor TS1>

As illustrated in FIG. 2, the on-cell mutual-capacitance touch sensor TS1 is formed as a mesh pattern of a mesh electrode layer provided on one surface of a transparent substrate when the on-cell mutual-capacitance touch sensor TS1 is viewed from above.

The on-cell mutual-capacitance touch sensor TS1 includes a plurality of first sensor electrodes (touch panel TX electrodes) 210 and a plurality of second sensor electrodes (touch panel RX electrodes) 220.

The plurality of first sensor electrodes (touch panel TX electrodes) 210 and the plurality of second sensor electrodes (touch panel RX electrodes) 220 are superimposed in a display area not illustrated.

The plurality of first sensor electrodes 210 are arranged in a D1 direction illustrated in FIG. 2.

Each of the first sensor electrodes 210 has, for example, a diamond shape including a floating pattern 611 and a peripheral part 612 surrounding the floating pattern 611, as illustrated in FIG. 2.

The peripheral parts 612 of the first sensor electrodes 210 are connected through mesh connection parts 613 to the peripheral parts 612 of the first sensor electrodes 210 adjacent to one another in the D1 direction, and the peripheral parts 612 form first touch sensor wires (T0 to T4).

The mesh connection parts 613 are formed of a material similar to the material of the first sensor electrodes 210.

The first sensor electrodes 210 are insulated, in the mesh electrode layer, from the mesh patterns (for example, floating patterns 611 and second sensor electrodes 220) not forming the first touch sensor wires.

As illustrated in FIG. 2, the D1 direction and a D2 direction cross each other.

The first sensor electrodes 210 are transmission electrodes in the on-cell mutual-capacitance touch sensor TS1.

The plurality of second sensor electrodes 220 are arranged in the D2 direction illustrated in FIG. 2.

Each of the second sensor electrodes 220 has, for example, a diamond shape including a floating pattern 621 and a peripheral part 622 surrounding the floating pattern 621, as illustrated in FIG. 2.

As illustrated in FIG. 4, the peripheral parts 622 of the second sensor electrodes 220 are connected by jumper wires 703 to the peripheral parts 622 of the second sensor electrodes 220 adjacent to one another in the D2 direction, on the back side of the transparent substrate. The peripheral parts 622 form second touch sensor wires (TR0 to TR5).

The jumper wires 703 are provided for the connection on the back side of the transparent substrate. Therefore, the mesh connection parts 613 and the jumper wires 703 are insulated, and the material of the jumper wires 703 does not have to be similar to the material of the second sensor electrodes 220.

The second sensor electrodes 220 are reception electrodes in the on-cell mutual-capacitance touch sensor TS1, and one ends of the second touch sensor wires (TR0 to TR5) are connected to a touch sensor signal reception circuit not illustrated.

<Configuration of RX Electrode Layer (RX Sensor Coil Group 200)>

Figure 3:
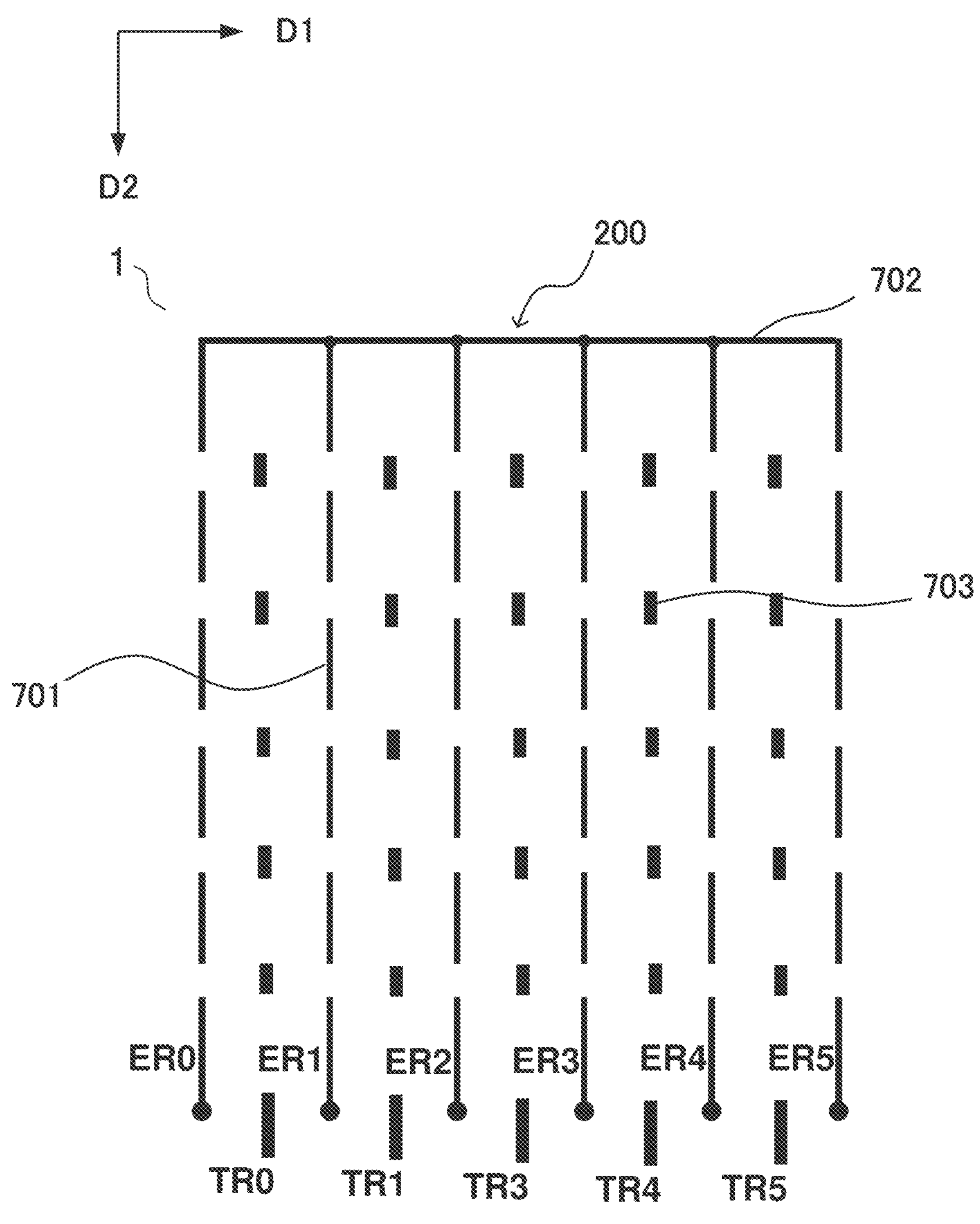
FIG. 3 depicts jumper wires on a back surface of the transparent substrate of the touch sensor in the sensor according to the first embodiment of the present disclosure.

As illustrated in FIGS. 3 and 4, the peripheral parts 612 of the first sensor electrodes 210 are connected by jumper wires 701 to the peripheral parts 612 of the first sensor electrodes 210 adjacent to one another in the D2 direction to form EMR sensor wires (ER0 to ER5), and one ends of the EMR sensor wires are connected to one another by a jumper wire 702 to form the RX electrode layer (RX sensor coil group 200) in the sensor 1 according to the present embodiment.

The RX electrode layer (RX sensor coil group 200) is a reception electrode in the EMR sensor, and the other ends of the EMR sensor wires are connected to an RX signal reception circuit not illustrated.

The jumper wires 701 and 702 are provided for the connection on the back side of the transparent substrate. Therefore, the material of the jumper wires 701 and 702 does not have to be similar to the material of the second sensor electrodes 220.

<Operation Mode During Capacitance (Finger Touch) Detection Based on Capacitance Detection System>

An operation mode during the capacitance (finger touch) detection based on the capacitance detection system in the sensor 1 according to the present embodiment will be described with reference to FIG. 5.

During the capacitance detection operation, the sensor 1 according to the present embodiment uses the first touch sensor wires T0 to T4 including the plurality of first sensor electrodes (touch panel TX electrodes) 210 and the second touch sensor wires TR0 to TR5 including the plurality of second sensor electrodes (touch panel RX electrodes) 220 to execute the capacitance detection operation.

Figure 5:
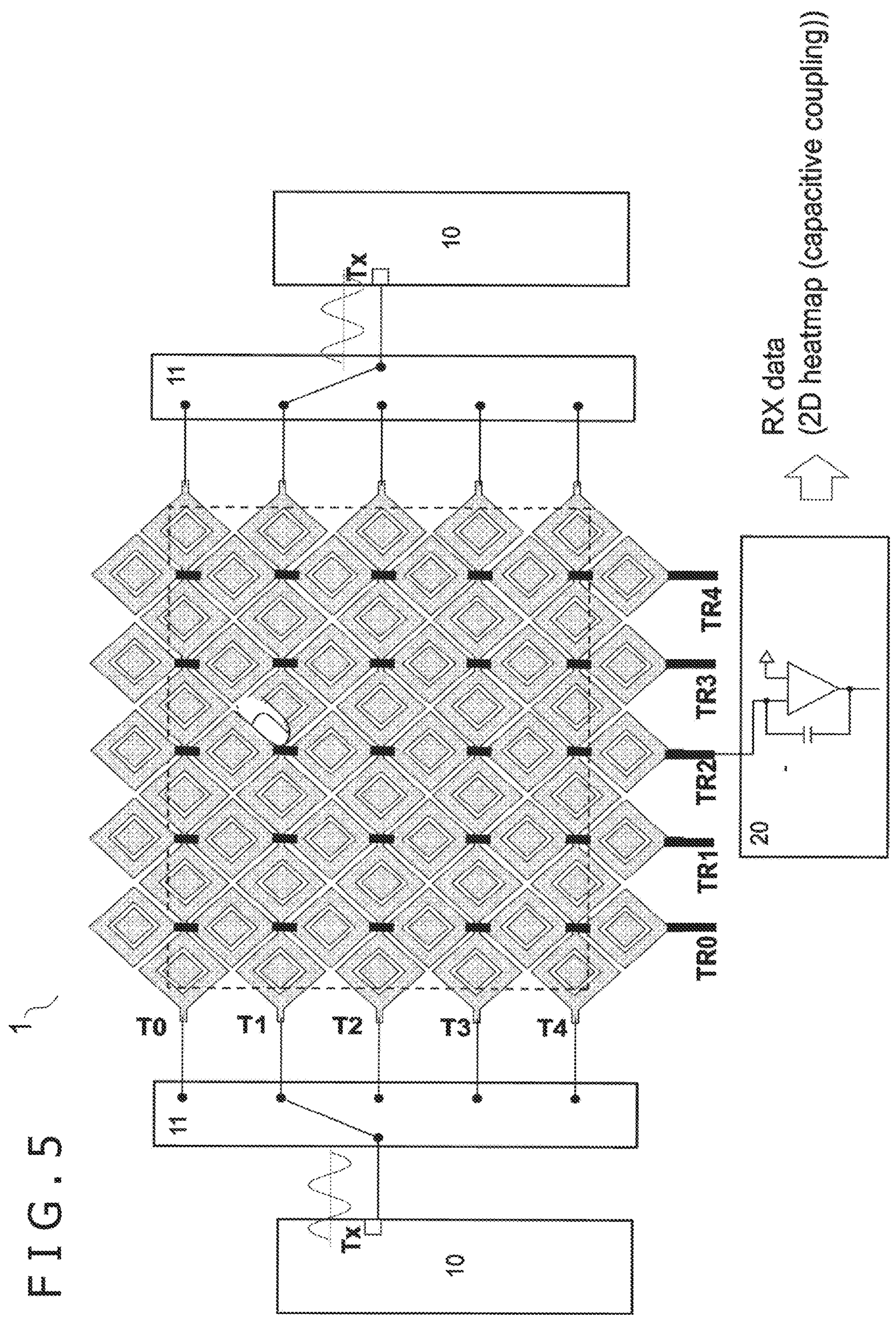
FIG. 5 depicts an operation mode during capacitance (finger touch) detection based on a capacitance detection system using the sensor according to the first embodiment of the present disclosure.

Specifically, a TX circuit 10 on the left side of FIG. 5 uses a normal-phase touch signal to drive one end of the first touch sensor wire T1 selected by a switch 11 among the first touch sensor wires T0 to T4.

Meanwhile, the TX circuit 10 on the right side of FIG. 5 uses a normal-phase touch signal to drive the other end of the first touch sensor wire T1 selected by the switch 11 among the first touch sensor wires T0 to T4.

In this way, a desirable potential (touch sensor TX signal) can be applied to the first touch sensor wire T1.

An RX circuit 20 detects, from the selected second touch sensor wire TR2, a change in the mutual capacitance from a reference value at a cross point (intersection of T1 and TR2).

The RX circuit 20 acquires, as a two-dimensional heatmap, the change in the capacitance at each cross point and uses calculation used in the capacitance detection, such as center of gravity calculation, to derive the position of the finger touch.

<Pen Detection Based on Electromagnetic Induction System>

To perform the pen detection on the basis of the electromagnetic induction system using the sensor 1 according to the present embodiment, the TX electrode layer (TX sensor coil group 100) provided in a layer below the sensor 1 and the RX electrode layer (RX sensor coil group 200) provided in the sensor 1 are used.

A configuration of the TX electrode layer (TX sensor coil group 100) will be illustrated with reference to FIG. 6 to describe the operation of the pen detection based on the electromagnetic induction system.

<Configuration of TX Electrode Layer (TX Sensor Coil Group 100)>

Figure 6:
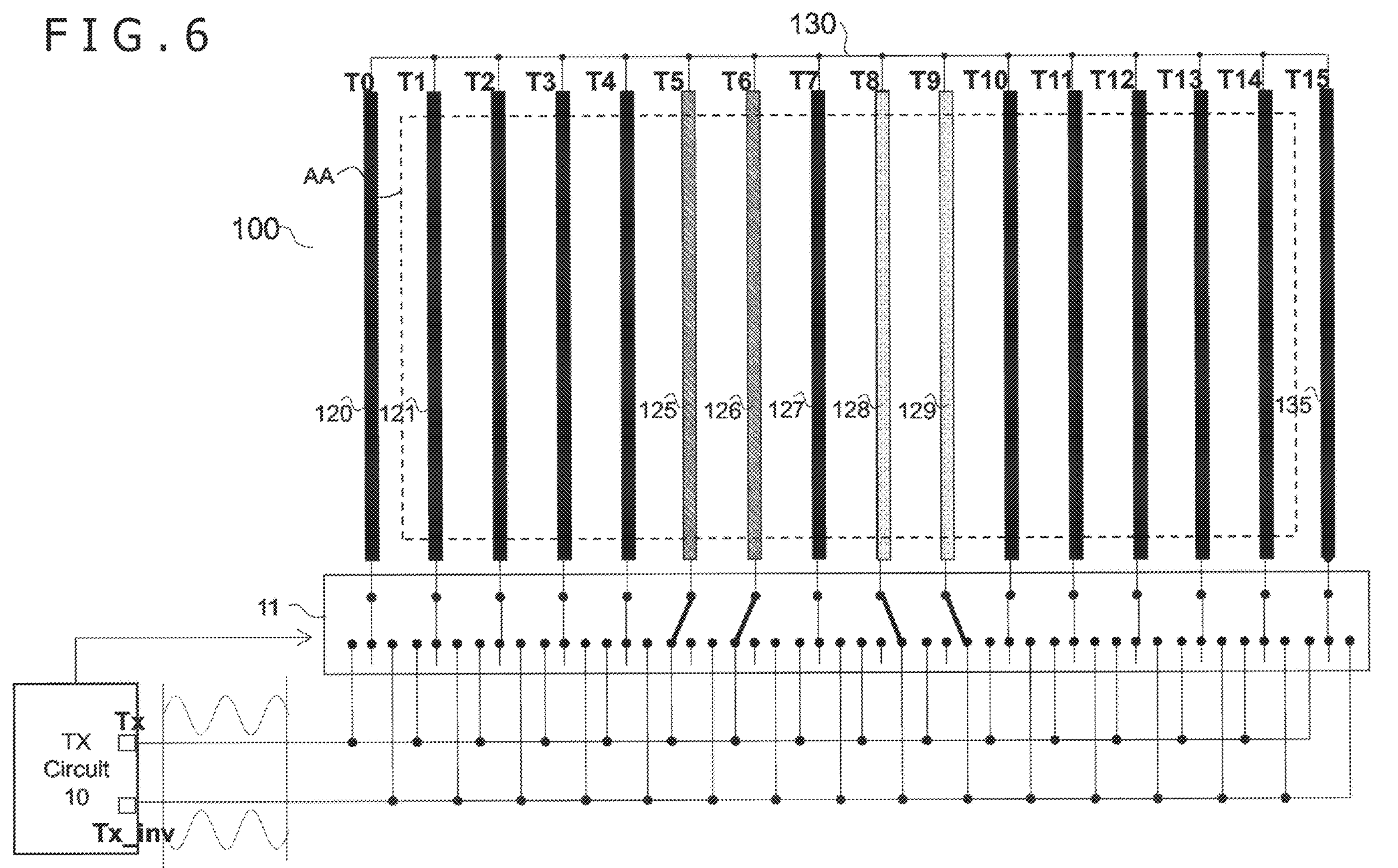
FIG. 6 depicts a configuration example of a TX sensor coil group in a position detection apparatus with the sensor according to the first embodiment of the present disclosure.

FIG. 6 is a diagram illustrating a configuration example of the TX electrode layer (TX sensor coil group 100).

The configuration of the TX electrode layer (TX sensor coil group 100) of FIG. 6 is particularly effective when the TX electrode layer (TX sensor coil group 100) and the RX electrode layer (RX sensor coil group 200) are provided in different layers separated from each other and are single layers.

The TX electrode layer (TX sensor coil group 100) is formed on one side of the substrate.

As illustrated in FIG. 6, the TX electrode layer (TX sensor coil group 100) includes TX electrodes 120 to 135 included in TX sensor coils T0 to T15, respectively, and a connection conductor 130 as a connection part that mutually connects the TX electrodes 120 to 135. The TX electrode layer (TX sensor coil group 100) has a comb shape (saw shape).

A position detection apparatus including the sensor 1 and the TX electrode layer (TX sensor coil group 100) according to the present embodiment controls the switch 11 to, for example, connect a bundle of the TX electrode 125 and the TX electrode 126 to TX terminals of the TX circuit 10 and connect a bundle of the TX electrode 128 and the TX electrode 129 to TX_inv terminals of the TX circuit 10.

The TX circuit 10 controls the TX terminals and the TX_inv terminals such that the amounts of change in current are in opposite phases. In this way, the TX circuit 10 forms a stronger transmission magnetic field between the bundle of the TX electrode 125 and the TX electrode 126 and the bundle of the TX electrode 128 and the TX electrode 129 (near the TX electrode 127) than when they are not bundled and than when the potential of TX_inv is fixed.

Note that the switch 11 and the TX circuit 10 may be mounted on separate integrated circuits or may be integrated into the same integrated circuit.

<Operation Mode During Pen Detection Based on Electromagnetic Induction System>

An operation mode during the pen detection based on the electromagnetic induction system in the sensor 1 according to the present embodiment will be described with reference to FIG. 7.

Note that the constituent elements related to the capacitance (finger touch) detection based on the capacitance detection system do not function during the pen detection based on the electromagnetic induction system. Therefore, the constituent elements are not illustrated in FIG. 7.

In a transmission period, the TX circuit 10 illustrated on the lower left of FIG. 6 uses a normal-phase signal to drive one ends of the sensor coils (T5 and T6 in FIG. 6) selected by the switch 11 among the transmission sensor coils (TX sensor coils) T0 to T4 of the transmission sensor coil group (TX sensor coil group 100) through the TX terminals.

Then, the TX circuit 10 uses a reverse-phase signal, in which the phase of the change in current is opposite the phase of the change in current of the normal-phase signal, to drive one ends of the sensor coils (T8 and T9 in FIG. 6) selected by the switch 11 through the TX_inv terminals.

In this way, a strong transmission magnetic field can be formed near the pen position.

Figure 7:
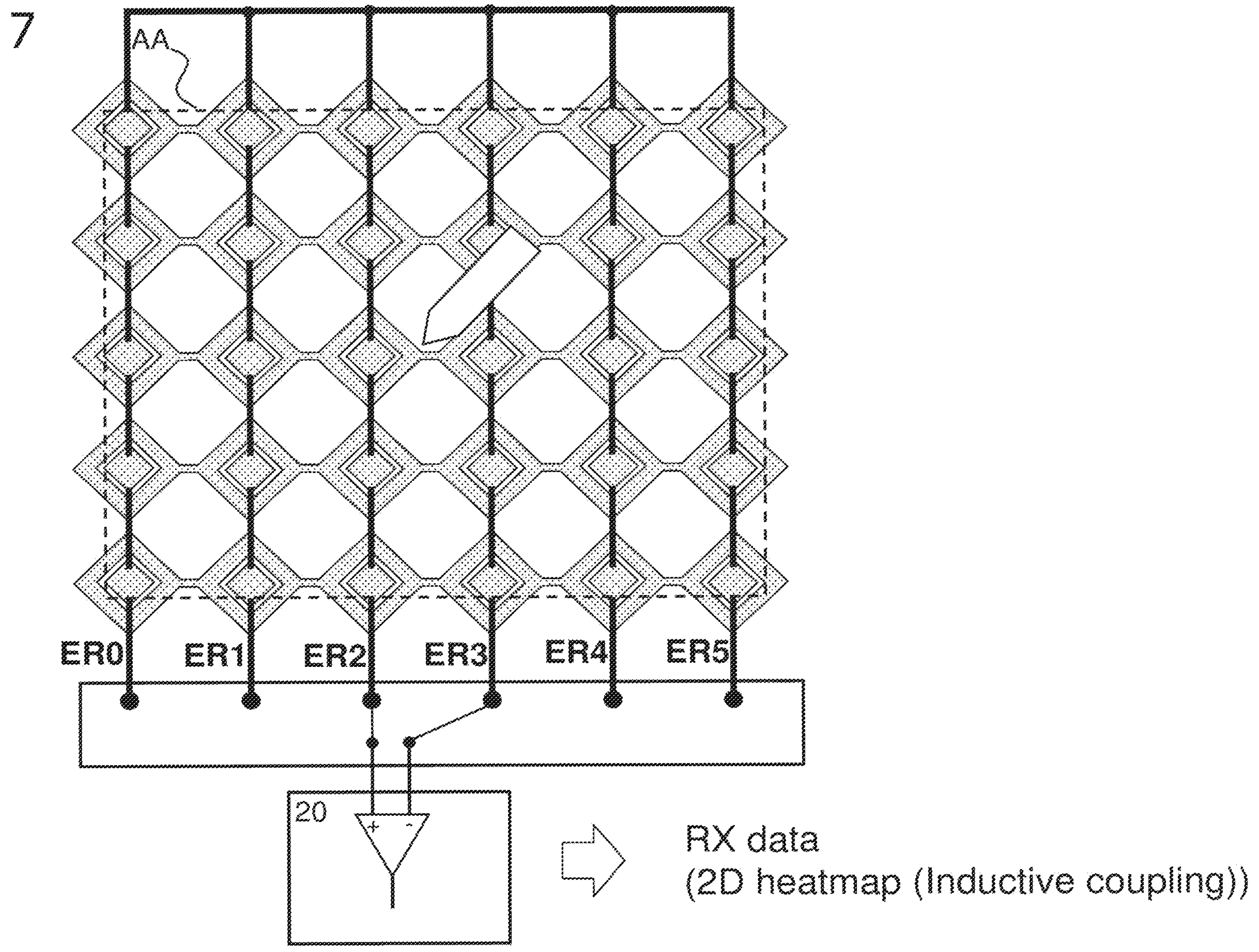
FIG. 7 depicts operation mode processing of pen detection based on an electromagnetic induction system using the sensor according to the first embodiment of the present disclosure.

In a detection period after the transmission period, the RX circuit 20 illustrated in FIG. 7 connects the RX sensor coil ER2 and the RX sensor coil ER3, which logically form one loop coil, to input ends of a differential amplification circuit through a switch 21 and detects the signal level of the pen signal penetrating the loop coil.

Subsequently, the RX circuit 20 acquires a two-dimensional heatmap (RXdata) and derives the coordinates, the slope, the direction of slope, and the like of the pen on the basis of the two-dimensional heatmap.

<Effects>

As described above, the sensor 1 according to the present embodiment includes the on-cell mutual-capacitance touch sensor TS1 and the RX electrode layer (RX sensor coil group 200) including the plurality of RX electrodes. The RX electrodes detect the pen alternating magnetic field generated by the pen that has accumulated the energy through the alternating magnetic field from the TX electrode layer (TX sensor coil group 100). The TX electrode layer includes the TX electrodes that generate the alternating magnetic field for detecting the position of the pen by using the electromagnetic induction effect. In the RX electrode layer (RX sensor coil group 200), the floating patterns that are surrounded by the touch electrodes formed by the mesh electrode pattern provided in the on-cell touch layer of the on-cell mutual-capacitance touch sensor TS1 and that are adjacent to one another in the extension direction of the RX electrodes are connected to one another by the jumper wires to linearly form the RX electrode wires.

That is, in the sensor 1 according to the present embodiment, at least the RX electrode layer (RX sensor coil group 200) for performing the pen detection on the basis of the electromagnetic induction system is integrated into the on-cell mutual-capacitance touch sensor TS1.

In addition, the RX electrode layer (RX sensor coil group 200) is formed by connecting the floating patterns that are surrounded by the touch electrodes formed by the mesh electrode pattern provided in the on-cell touch layer of the on-cell mutual-capacitance touch sensor TS1 and that are adjacent to one another in the extension direction of the RX electrodes.

Therefore, in the position detection apparatus with the sensor 1 according to the present embodiment, the thickness of the stack structure can be reduced, and the design can be improved, while the performance of the position detection apparatus is maintained.

Further, the floating patterns adjacent to one another in the extension direction of the RX electrodes are connected to one another by the jumper wires in the sensor 1 according to the present embodiment.

That is, the current flowing through the RX electrodes is a small current, and jumper wires with a small diameter can be used.

Moreover, the wires are on the back side of the on-cell touch layer formed by the mesh electrode pattern.

Therefore, the thickness of the stack structure can be reduced, and the design can be improved, without impairing the visibility of the display.

In the sensor 1 according to the present embodiment, one ends of the linearly formed EMR sensor wires (ER0 to ER5) are connected to the circuit unit configured to receive the pen signal, which is the response alternating magnetic field, and configured to acquire the level of the pen signal, and the other ends of the EMR sensor wires (ER0 to ER5) are connected to one another by the jumper wire 702.

Therefore, the RX electrode layer (RX sensor coil group 200) used in the position detection of the pen based on the electromagnetic induction system can reduce the cost without losing the visibility of the display, maintain the performance of the position detection apparatus, reduce the thickness of the stack structure, and improve the design.

Second Embodiment

A sensor 1A according to a second embodiment will be described with reference to FIGS. 8 to 13.

<Configuration of Sensor 1A>

Figure 8:
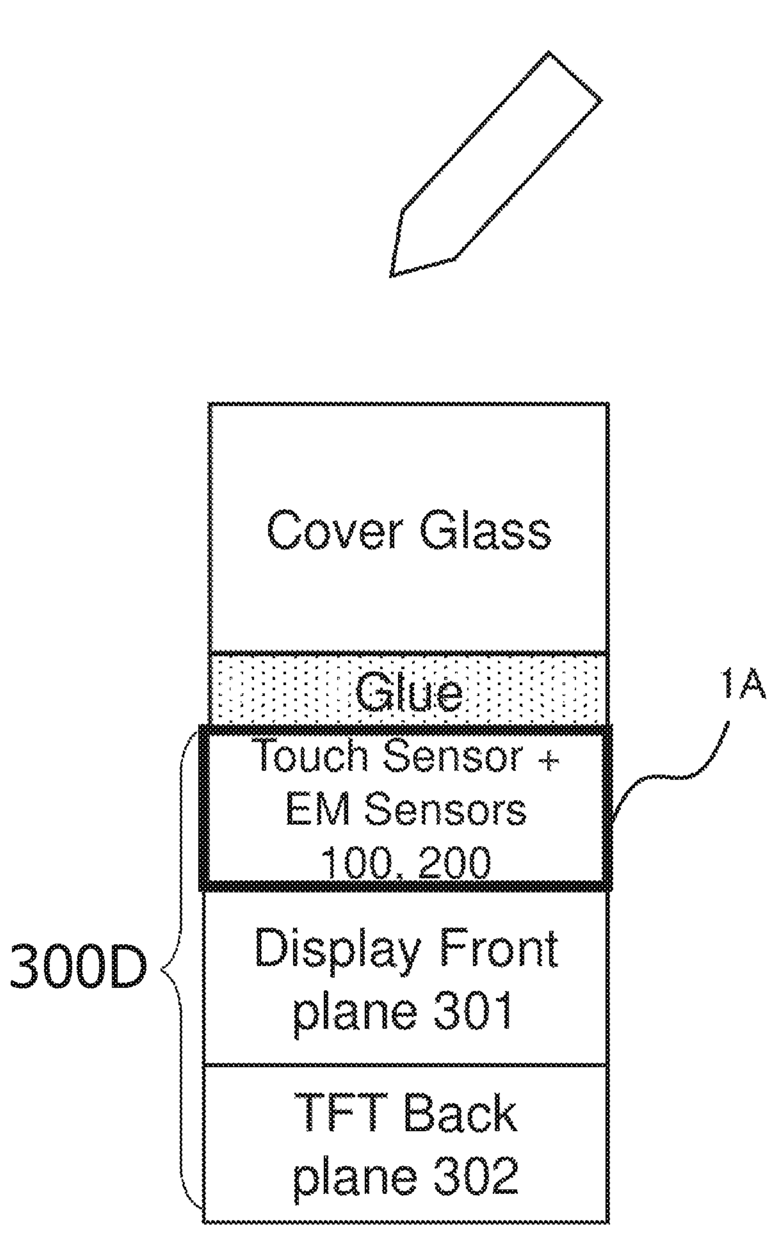
FIG. 8 is a diagram illustrating an example of a stack configuration in which a position detection sensor, a touch sensor for detecting a finger or the like on the basis of the capacitance (self-capacitance or mutual capacitance) system, and a display apparatus are combined (or incorporated) in a sensor according to a second embodiment of the present disclosure.
Figure 9:
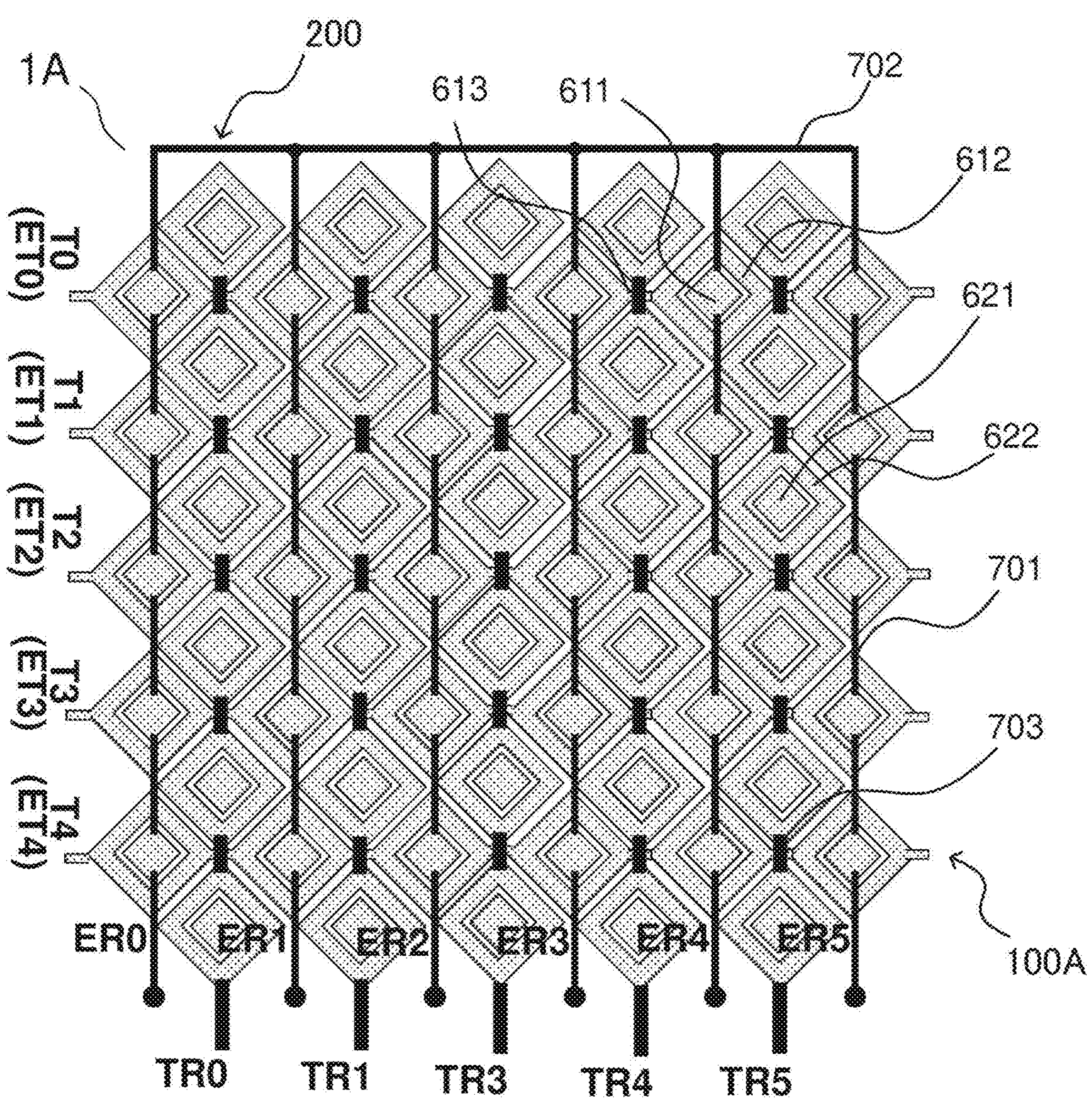
FIG. 9 is a diagram illustrating a configuration of the sensor according to the second embodiment of the present disclosure.

As illustrated in FIGS. 8 and 9, the sensor 1A according to the present embodiment includes the on-cell mutual-capacitance touch sensor TS1, a TX electrode layer (TX sensor coil group 100A) including the TX electrodes that generate the alternating magnetic field for detecting the position of the pen by using the electromagnetic induction effect, and the RX electrode layer (RX sensor coil group 200) including the plurality of RX electrodes that detect the pen alternating magnetic field generated by the pen that has accumulated the energy through the alternating magnetic field from the TX electrode layer (TX sensor coil group 100A).

Note that the functions and the like of the constituent elements are similar to those of the first embodiment, and the details will not be described.

<Stack Configuration of Display with Sensor 1A>

FIG. 8 illustrates an example of the stack configuration of a display with the sensor 1A according to the present embodiment, and FIG. 8 is based on a display configuration that is what is called on-cell touch.

A display 300D includes the display front plane 301 and the TFT back plane 302 that controls the display front plane 301.

FIG. 8 illustrates what is called an on-cell touch panel configuration including, in the module of the display 300D, the capacitance touch sensor TS1 in a layer on the upper side of the display front plane 301.

The sensor 1A includes, for example, the on-cell mutual-capacitance touch sensor TS1 and the electromagnetic induction sensor, in which the first electrode group included in the on-cell mutual-capacitance touch sensor TS1 and the second electrode group included in the electromagnetic induction sensor are provided in three or fewer layers including at least a layer with a mix of part of the first electrode group and part of the second electrode group.

That is, in the sensor 1A, the first electrode group included in the on-cell mutual-capacitance touch sensor TS1 and the second electrode group included in the electromagnetic induction sensor are provided in three or fewer layers including at least a layer with a mix of part of the first electrode group and part of the second electrode group (hereinafter may be referred to as a “mixed layer”).

More specifically, the sensor 1A may include, for example, at least a first layer including the first electrode group included in the on-cell mutual-capacitance touch sensor TS1, a second layer (mixed layer) including auxiliary wires connecting some of the electrodes of the first electrode group to one another and some of the electrodes of the second electrode group included in the electromagnetic induction sensor, and a third layer including some other of the electrodes of the second electrode group included in the electromagnetic induction sensor.

Although the first layer provided with the on-cell mutual-capacitance touch sensor TS1, the mixed layer, and the layer provided with part of the electromagnetic induction sensor are illustrated above, the mixed layer does not have to be the intermediate layer of the three-layer configuration.

That is, any combination including the mixed layer is possible if there is no problem in performance and the like.

As illustrated in FIGS. 2, 3, and 9, the sensor 1A may have, for example, a two-layer structure including a shared layer and a mixed layer. The shared layer is shared by the electrode group extending in a first direction of the on-cell mutual-capacitance touch sensor TS1 and some of the electrodes of the second electrode group that generate the alternating magnetic field for detecting the position of the pen in the electromagnetic induction sensor. In the mixed layer, some of the other electrodes of the second electrode group that detect the pen alternating magnetic field generated by the pen that has accumulated the energy through the alternating magnetic field from the some of the electrodes of the second electrode group and the electrode group extending in a second direction crossing the first direction of the on-cell mutual-capacitance touch sensor TS1 are connected to one another through the auxiliary wires.

Examples of the auxiliary wires here include jumper wires and bridge wires.

The auxiliary wires (such as jumper wires and bridge wires) are conductors installed on a layer provided with wires electrically connected to one another by the auxiliary wires, and the auxiliary wires complement the conductors included in other layers to form a touch sensor or an electromagnetic induction sensor.

Figure 12:
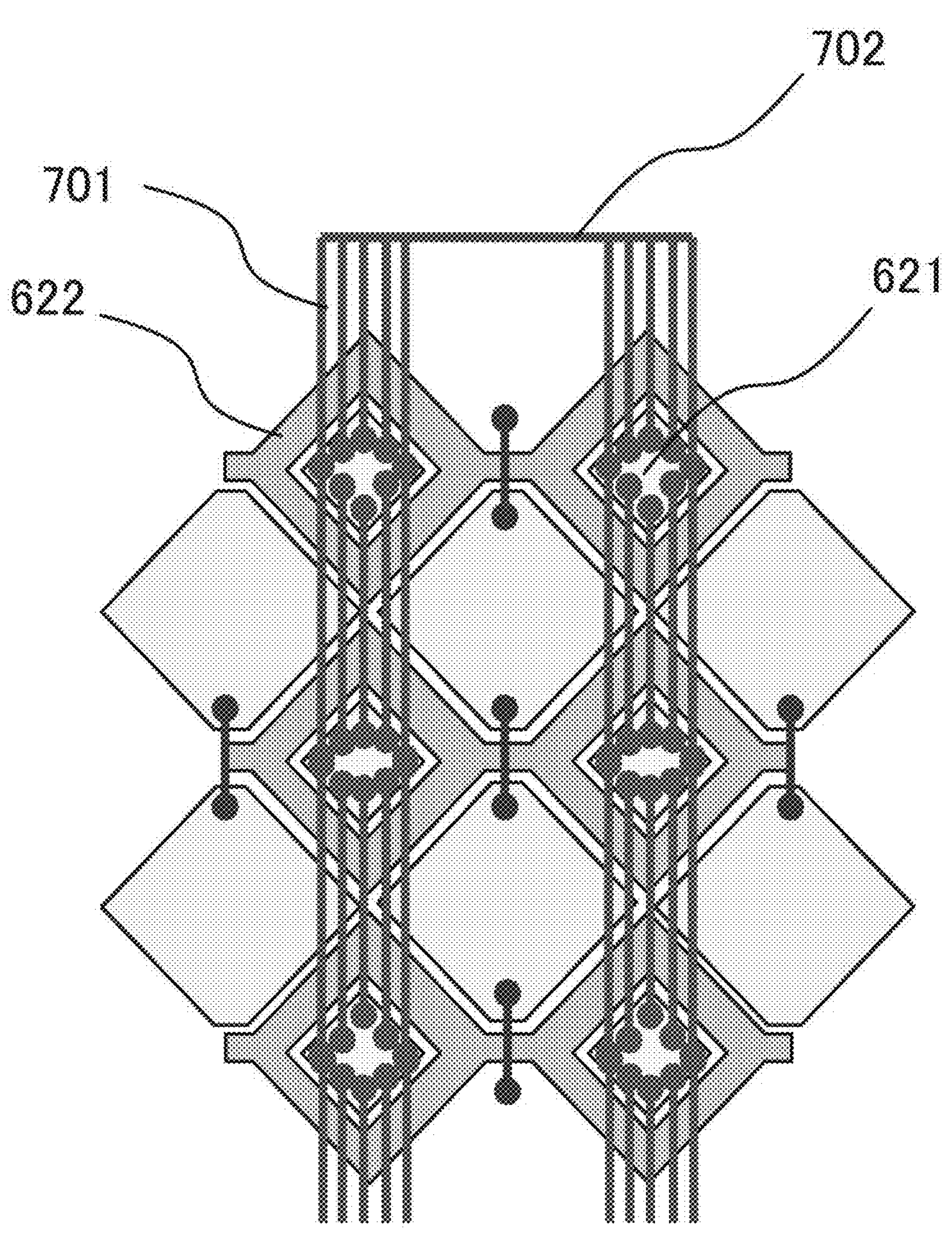
FIG. 12 depicts a wiring pattern in a modification of the sensor according to the second embodiment of the present disclosure.

As illustrated in FIG. 12, the peripheral parts of the first sensor electrodes 210 adjacent to each other in the first direction are connected to each other by a plurality of wires or by a connection part including a wide wire. In the some other of the electrodes of the second electrode group, the floating patterns 621 of the second sensor electrodes 220 adjacent to each other in the extension direction are connected to each other by a plurality of auxiliary wires.

Figure 13:
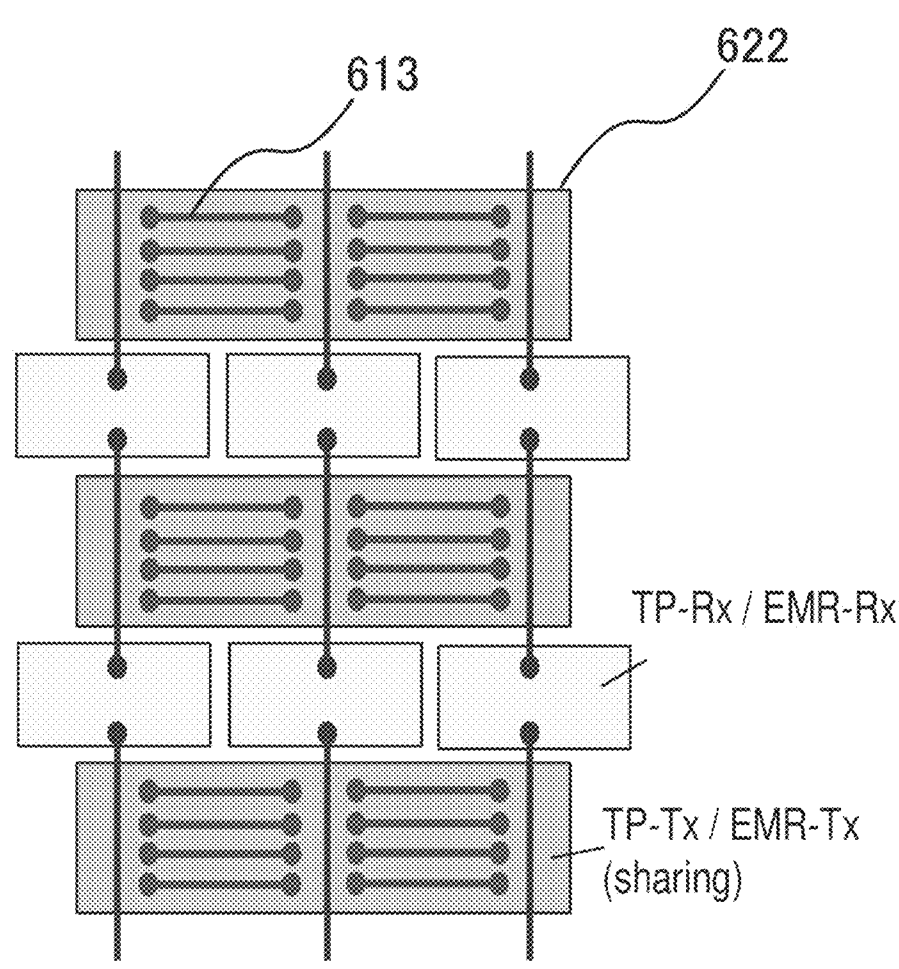
FIG. 13 depicts a wiring pattern in a modification of the sensor according to the second embodiment of the present disclosure.

Although the shapes of the second sensor electrodes 220 and the first sensor electrodes 210 are different from those of FIG. 9 and the like, a plurality of wires are added to the peripheral parts 622 of the floating patterns 611 or the floating patterns 621 in the first sensor electrodes 210 or the second sensor electrodes 220 as illustrated in FIG. 13 depicting the concept.

The TX electrode layer (TX sensor coil group 100A) and the RX electrode layer (RX sensor coil group 200) are integrated into the on-cell mutual-capacitance touch sensor TS1.

Specifically, the on-cell mutual-capacitance touch sensor TS1 is an on-cell mutual-capacitance touch sensor TS1 based on the on-cell mutual-capacitance system. The RX electrode layer (RX sensor coil group 200) has the configuration illustrated in the first embodiment. In the TX electrode layer (TX sensor coil group 100A), T0 of the plurality of first sensor electrodes (touch panel TX electrodes) 210 in the on-cell mutual-capacitance touch sensor TS1 also serves as ET0 of the TX electrode layer (TX sensor coil group 100A) as illustrated in FIG. 9, for example.

As illustrated in FIG. 3, the shape of the coil group including the some other of the electrodes of the second electrode group connected by the auxiliary wires is a comb shape.

As illustrated in FIG. 9, the sensor electrodes 210 and 220 of the on-cell mutual-capacitance touch sensor TS1 include the floating patterns 611 and 621 and the peripheral parts surrounding the floating patterns 611 and 612 from the outside. The linear coil group including the floating patterns 621 from the open end side to the finish end side of the comb-shaped coil group and the auxiliary wire 702 is arranged not to overlap, in plan view, the linear coil group including the peripheral parts 622 extending in the second direction crossing the first direction of the on-cell mutual-capacitance touch sensor TS1 and the auxiliary wires 703.

The comb shape here represents a shape formed by the following first wire and second wires.

The first wire is a wire extending in the first direction. The second wires are a plurality of wires extending in the second direction crossing the first direction, and the plurality of second wires are lined up and arranged in the first direction at predetermined intervals.

The first wire and the plurality of second wires are electrically connected to each other.

For the convenience, one ends of the plurality of second wires connected to the first wire will be referred to as finish ends, and the other ends will be referred to as open ends. The one ends of the plurality of second wires are connected to the first wire, and the other ends are open. The shape of the plurality of second wires is a comb shape.

The open ends that are the other ends of the plurality of second wires are connected to the integrated circuit and used for, for example, delivering the drive signal or detecting the reception signal.

<Pen Detection Based on Electromagnetic Induction System>

An operation mode during the pen detection based on the electromagnetic induction system in the sensor 1A according to the present embodiment will be described with reference to FIG. 10.

Note that the operation mode during the capacitance (finger touch) detection based on the capacitance detection system is similar to that of the first embodiment, and the details will not be described.

The constituent elements related to the capacitance (finger touch) detection based on the capacitance detection system do not function during the pen detection based on the electromagnetic induction system. Therefore, the constituent elements are not illustrated in FIG. 10.

Figure 10:
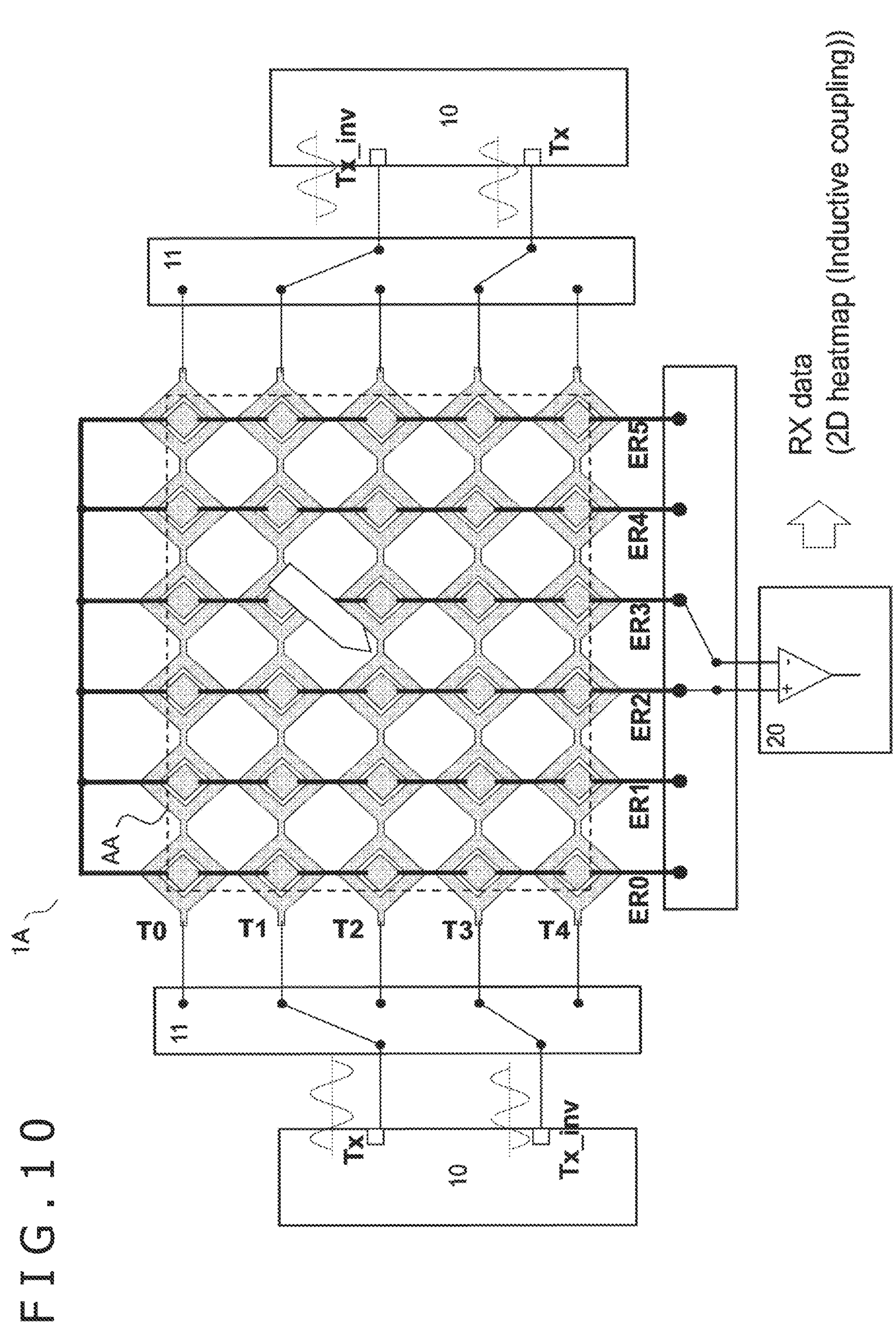
FIG. 10 depicts operation mode processing during pen position detection based on the electromagnetic induction system using the sensor according to the second embodiment of the present disclosure.

In the transmission period, the TX circuit 10 illustrated on the left side of FIG. 10 uses the normal-phase signal to drive one end of the sensor coil (T1 in FIG. 10) selected by the switch 11 among the transmission sensor coils (TX sensor coils) T0 to T4 of the transmission sensor coil group (TX sensor coil group 100A) through the TX terminal.

On the other hand, the TX circuit 10 uses the reverse-phase signal, in which the phase of the change in current is opposite the phase of the change in current of the normal-phase signal, to drive one end of the sensor coil (TX sensor coil, T3 in FIG. 10) selected by the switch 11 through the TX_inv terminal.

At the same time, the TX circuit 10 positioned on the right side of FIG. 10 uses the reverse-phase signal, in which the phase of the change in current is opposite the phase of the change in current of the normal-phase signal, to drive the other end of the sensor coil (TX sensor coil, T3 in FIG. 10) selected by the switch 11 through the TX_inv terminal.

On the other hand, the TX circuit 10 uses the normal-phase signal to drive the other end of the sensor coil (TX sensor coil, T1 in FIG. 1) selected by the switch 11 among the transmission sensor coils T0 to T4 of the transmission sensor coil group (TX sensor coil group 100A) through the TX terminal.

In this way, the strong transmission magnetic field can be formed near the pen position (near T2 in FIG. 10).

In the detection period after the transmission period, the RX circuit 20 connects the RX sensor coil ER2 and the RX sensor coil ER3, which logically form one loop coil, to the input ends of the differential amplification circuit through the switch 21 and detects the signal level of the pen signal penetrating the loop coil.

Subsequently, the RX circuit 20 acquires a two-dimensional heatmap (RXdata) and derives the coordinates, the slope, the direction of slope, and the like of the pen on the basis of the two-dimensional heatmap.

<Effects>

As described above, the sensor 1A according to the present embodiment includes the on-cell mutual-capacitance touch sensor TS1, the TX electrode layer (TX sensor coil group 100A) including the TX electrodes that generate the alternating magnetic field for detecting the position of the pen by using the electromagnetic induction effect, and the RX electrode layer (RX sensor coil group 200) including the plurality of RX electrodes that detect the pen alternating magnetic field generated by the pen that has accumulated the energy through the alternating magnetic field from the TX electrode layer (TX sensor coil group 100A).

That is, the sensor 1A according to the present embodiment integrates the on-cell mutual-capacitance touch sensor TS1 and the EMR sensor by using, as the TX electrode layer (TX sensor coil group 100A) for performing the pen detection on the basis of the electromagnetic induction system, the first sensor electrodes (touch panel TX electrodes) 210 in the on-cell mutual-capacitance touch sensor TS1 in the sensor 1 according to the first embodiment during the pen detection based on the electromagnetic induction system.

Therefore, in the position detection apparatus with the sensor 1A according to the present embodiment, the thickness of the stack structure can be reduced, and the design can be improved, while the performance of the position detection apparatus is maintained.

In addition, the floating patterns adjacent to one another in the extension direction of the RX electrodes are connected to one another by the jumper wires.

That is, the current flowing through the RX electrodes is a small current, and jumper wires with a small diameter can be used. The jumper wires are wired on the back side of the on-cell touch layer formed by the mesh electrode pattern.

Therefore, the thickness of the stack structure can be reduced, and the design can be improved, without impairing the visibility of the display.

Further, the TX electrode layer (TX sensor coil group 100A) includes the first sensor electrodes (touch panel TX electrodes) 210 including the touch electrodes formed by the mesh electrode pattern provided in the on-cell touch layer of the on-cell mutual-capacitance touch sensor TS1.

Therefore, even when the RX electrode layer (RX sensor coil group 200) and the TX electrode layer (TX sensor coil group 100A) are integrated into the on-cell mutual-capacitance touch sensor TS1, the thickness of the stack structure can be reduced, and the design can be improved, without impairing the visibility of the display.

The sensor 1A according to the present embodiment includes the on-cell mutual-capacitance touch sensor TS1 and the electromagnetic induction sensor, and the first electrode group included in the on-cell mutual-capacitance touch sensor TS1 and the second electrode group included in the electromagnetic induction sensor are provided in three or fewer layers including at least the layer with a mix of part of the first electrode group and part of the second electrode group.

That is, in the sensor 1A, the first electrode group included in the on-cell mutual-capacitance touch sensor TS1 and the second electrode group included in the electromagnetic induction sensor are provided in three or fewer layers including at least a layer with a mix of part of the first electrode group and part of the second electrode group (hereinafter may be referred to as the "mixed layer").

Therefore, the thickness of the stack structure can be reduced while the performance of the position detection apparatus is maintained.

Further by realizing the above stack configuration, the optical characteristics of the display apparatus can be improved, and the design of the display apparatus can be improved.

The sensor 1A according to the present embodiment includes at least: the first layer including the first electrode group included in the on-cell mutual-capacitance touch sensor TS1; the second layer (mixed layer) including the auxiliary wires connecting some of the electrodes of the first electrode group to one another and some of the electrodes of the second electrode group included in the electromagnetic induction sensor; and the third layer including some other of the electrodes of the second electrode group included in the electromagnetic induction sensor.

Therefore, the thickness of the stack structure can be reduced while the performance of the position detection apparatus is maintained.

Further, by realizing the above stack configuration, the optical characteristics of the display apparatus can be improved, and the design of the display apparatus can be improved.

The sensor 1A according to the present embodiment has the two-layer structure including the shared layer and the mixed layer. The shared layer is shared by the electrode group extending in the first direction of the on-cell mutual-capacitance touch sensor TS1 and some of the electrodes of the second electrode group that generate the alternating magnetic field for detecting the position of the pen in the electromagnetic induction sensor. In the mixed layer, some of the other electrodes of the second electrode group that detect the pen alternating magnetic field generated by the pen that has accumulated the energy through the alternating magnetic field from the some of the electrodes of the second electrode group and the electrode group extending in the second direction crossing the first direction of the on-cell mutual-capacitance touch sensor TS1 are connected to one another through the auxiliary wires.

Therefore, the thickness of the stack structure can be further reduced while the performance of the position detection apparatus is maintained.

In addition, by realizing the above stack configuration, the optical characteristics of the display apparatus can be further improved, and the design of the display apparatus can be further improved.

In the sensor 1A according to the present embodiment, the auxiliary wires include the jumper wires, the bridge wires, or the like.

Therefore, the thickness of the stack structure can be reduced while the performance of the position detection apparatus is maintained.

Further, by realizing the above stack configuration, the optical characteristics of the display apparatus can be improved, and the design of the display apparatus can also be improved.

In the sensor 1A according to the present embodiment, the shape of the coil group including the some other of the electrodes of the second electrode group connected by the auxiliary wires is a comb shape.

That is, the coil group 200 including the some other of the electrodes of the second electrode group connected by the auxiliary wires is formed in the comb shape. In this way, the coils adjacent to each other do not overlap with each other, and there are gaps between the coils. The coils are wound for one turn (not wound for a plurality of turns).

Therefore, the optical characteristics of the display apparatus can be improved.

The coil group 200 including the some other of the electrodes of the second electrode group connected by the auxiliary wires is formed in the comb shape, while the performance of the position detection apparatus is maintained. In this way, the thickness of the stack structure can be reduced, and the design of the display apparatus can be improved.

In the sensor 1A according to the present embodiment, the sensor electrodes 210 and 220 of the on-cell mutual-capacitance touch sensor TS1 include the floating patterns 611 and 621 and the peripheral parts surrounding the floating patterns 611 and 612 from the outside, and the linear coil group including the floating patterns 621 from the open end side to the finish end side of the comb-shaped coil group and the auxiliary wire 702 is arranged not to overlap, in plan view, the linear coil group including the peripheral parts 622 extending in the second direction crossing the first direction of the on-cell mutual-capacitance touch sensor TS1 and the auxiliary wires 703.

That is, as illustrated in FIG. 9, the linear coils including the peripheral parts 622 extending in the second direction crossing the first direction of the on-cell mutual-capacitance touch sensor TS1 and the auxiliary wires 703 are arranged between the linear coils including the floating patterns 621 from the open end side to the finish end side of the comb-shaped coil group and the auxiliary wire 702 in plan view.

If the linear coil group including the peripheral parts 622 extending in the second direction crossing the first direction of the on-cell mutual-capacitance touch sensor TS1 and the auxiliary wires 703 and the linear coil group including the floating patterns 621 from the open end side to the finish end side of the comb-shaped coil group and the auxiliary wire 702 overlap in plan view, a large parasitic capacitance is generated between the linear coil group including the peripheral parts 622 extending in the second direction crossing the first direction of the on-cell mutual-capacitance touch sensor TS1 and the auxiliary wires 703 and the linear coil group including the floating patterns 621 from the open end side to the finish end side of the comb-shaped coil group and the auxiliary wire 702, and the performance is degraded.

In the sensor 1A according to the present embodiment, the linear coils including the peripheral parts 622 extending in the second direction crossing the first direction of the on-cell mutual-capacitance touch sensor TS1 and the auxiliary wires 703 are arranged between the linear coils including the floating patterns 621 from the open end side to the finish end side of the comb-shaped coil group and the auxiliary wire 702 in plan view. In this way, the generation of a large parasitic capacitance can be prevented, and the optical characteristics of the display apparatus can be improved because the coils physically do not overlap.

Also, the thickness of the stack structure can be reduced, and the design of the display apparatus can be improved, while the performance of the position detection apparatus is maintained.

In the sensor 1A according to the present embodiment, the peripheral parts of the first sensor electrodes 210 adjacent to each other in the first direction are connected to each other by a plurality of wires or by a connection part including a wide wire, and in the some other of the electrodes of the second electrode group, the floating patterns 621 of the second sensor electrodes 220 adjacent to each other in the extension direction are connected to each other by a plurality of auxiliary wires.

That is, the peripheral parts of the first sensor electrodes 210 adjacent to each other in the first direction are connected to each other by a plurality of wires or by a connection part including a wide wire as illustrated in FIG. 12.

In the some other of the electrodes of the second electrode group, the floating patterns 621 of the second sensor electrodes 220 adjacent to each other in the extension direction are connected to each other by a plurality of auxiliary wires.

By adopting the connection mode, the connection impedance between the electrodes can be reduced.

Further, by using a plurality of wires, the reduction in the visibility can be suppressed.

In the sensor 1A according to the present embodiment, a plurality of wires are added to the peripheral parts 622 of the floating patterns 611 or the floating patterns 621 in the first sensor electrodes 210 or the second sensor electrodes 220.

By adopting the mode, the impedance of the peripheral parts 622 of the floating patterns 611 or the floating patterns 621 in the first sensor electrodes 210 or the second sensor electrodes 220 can be reduced.

Third Embodiment

A position detection apparatus 2 according to a third embodiment will be described with reference to FIGS. 14 and 15.

<Configuration of Position Detection Apparatus 2>

As illustrated in FIG. 14, the position detection apparatus 2 includes the TX circuit 10, the switch 11, the TX sensor coil group 100, the RX sensor coil group 200, the RX circuit 20, and peripheral circuits such as an amplifier.

Note that the position detection apparatus 2 according to the present embodiment is the position detection apparatus with the sensor 1 according to the first embodiment, and the details of the RX sensor coil group 200 and the like will not be described.

The TX sensor coil group 100 includes a plurality of conducting wires including a plurality of electrodes arranged together in the first direction (X-axis direction) of the sensor.

The TX sensor coils included in the TX sensor coil group 100 include, for example, rectangular loop coils.

The TX sensor coils included in the TX sensor coil group 100 are lined up and arranged at, for example, equal intervals.

The TX circuit 10 functions as an alternating magnetic field generation unit that transmits a signal to the TX sensor coil group 100 through the switch 11 to generate an alternating magnetic field from the TX sensor coil group 100.

That is, in the position detection apparatus 2 according to the present embodiment, the TX sensor coils T0, T1, . . . , and T4 are connected to the TX circuit 10 and used for generating the alternating magnetic field. However, they are not used for detecting the pen signal.

The RX circuit 20 functions as a pen signal level acquisition unit that uses a plurality of electrodes of the RX sensor coil group 200 to receive a pen signal, which is a response alternating magnetic field from the position indicator accumulated by the alternating magnetic field, to acquire the level of the pen signal.

Specifically, the RX circuit 20 derives the coordinates or the like of the pen at cross points where, for example, a plurality of electrodes (TX electrodes) arranged together in the first direction (X-axis direction) of the sensor and a plurality of electrodes (RX electrodes) arranged together in the second direction (Y-axis direction) crossing the first direction (X-axis direction) intersect.

That is, although the RX sensor coils R0, R1, . . . , and R4 are connected to the RX circuit 20 and used for detecting the pen signal, they are not used for generating the transmission magnetic field.

The RX circuit 20 functions as an information derivation unit that uses a two-dimensional distribution of the levels of the pen signal at intersections of a plurality of conducting wires of the TX sensor coil group 100 and a plurality of electrodes of the RX sensor coil group 200 to derive information related to the position of the position indicator.

The information related to the position of the pen (position indicator) here includes one of the slope of the pen with respect to the normal of the sensor plane (XY plane including X-axis and Y-axis) and the direction of the slope of the pen with respect to the sensor plane.

The information derivation unit of the RX circuit 20 derives one of the slope of the pen with respect to the normal of the sensor plane and the direction of the slope of the pen with respect to the sensor plane on the basis of the asymmetry of the two-dimensional distribution.

The information derivation unit of the RX circuit 20 acquires a first reference position that is the indicated position of the pen tip of the pen and acquires a second reference position protruding upward or protruding downward to derive the direction of the slope of the pen with respect to the sensor plane on the basis of the direction of the second reference position with respect to the first reference position.

The information derivation unit of the RX circuit 20 derives the slope of the pen with respect to the normal of the sensor plane on the basis of the level strength of the pen signal at the first reference position and the level strength of the pen signal at the second reference position.

<Process of Position Detection Apparatus 2>

In the position detection apparatus 2, the TX circuit 10 uses the switch 11 to switch and select one TX sensor coil of the TX sensor coil group 100 that generates the transmission magnetic field, and the TX circuit 10 drives the selected TX sensor coil to transmit the transmission magnetic field.

Figure 11:
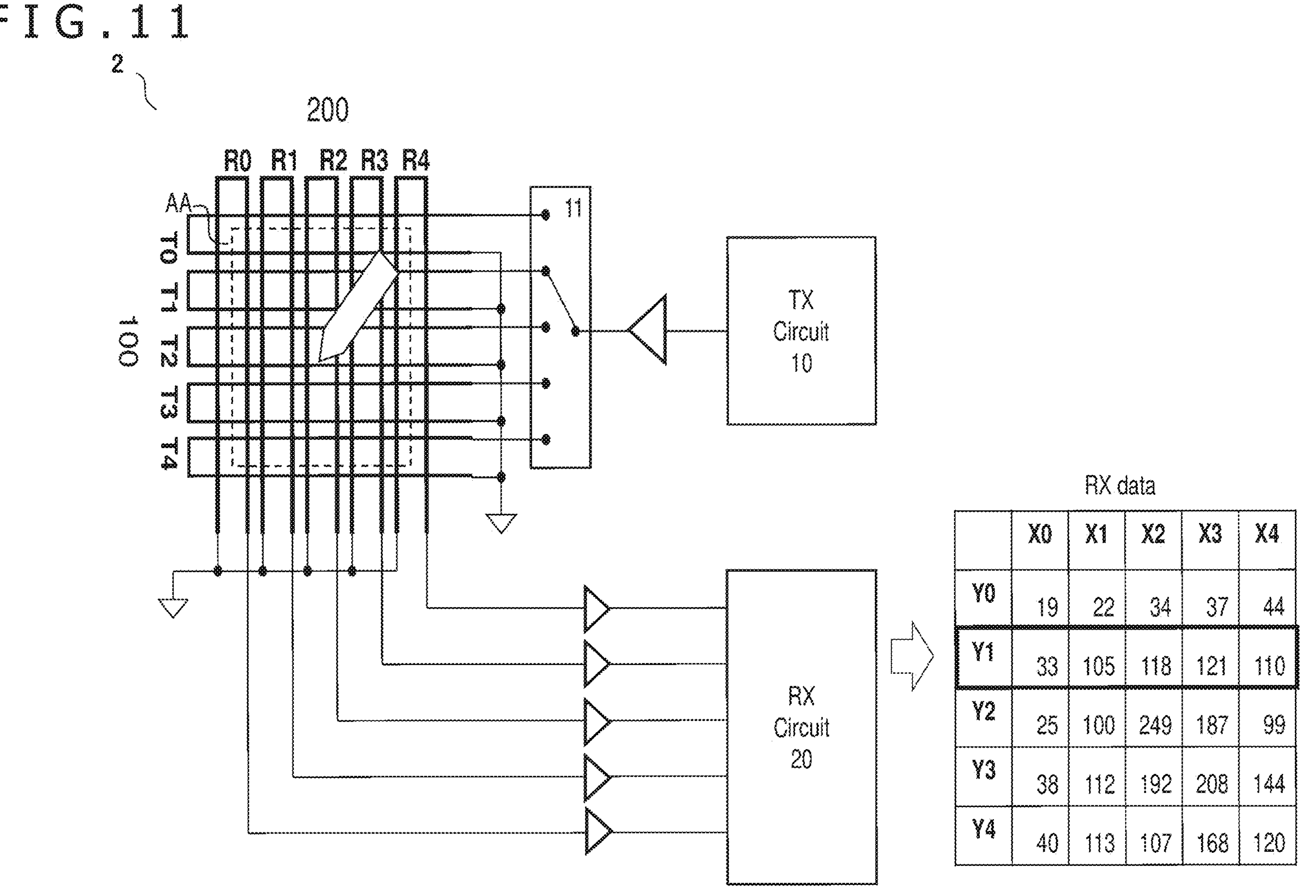
FIG. 11 is a conceptual diagram illustrating a coordinate derivation operation of a position detection apparatus according to the second embodiment of the present disclosure.

FIG. 11 illustrates a state in which the TX sensor coil T1 is selected.

After a certain transmission period, that is, after a period in which predetermined energy is accumulated when the pen is near the TX sensor coil, the position detection apparatus 2 obtains the levels of the pen signal at the positions of all the RX sensor coils.

The position detection apparatus 2 detects level values (33, 105, 118, 121, and 110 in FIG. 11) of the pen signal in areas where the TX sensor coil T1 and the RX sensor coils R1, R2, . . . , and R4 cross (hereinafter, "coil cross point areas").

The position detection apparatus 2 sequentially switches the selection of the TX sensor coils to obtain two-dimensional heatmap data RXdata on the basis of the signal levels at the coil cross points.

After acquiring the two-dimensional heatmap data RXdata, the position detection apparatus 2 executes the process of coordinate processing to obtain the coordinates of the pen, the slope of the pen (angle from the normal with respect to the sensor surface), or the orientation of the pen (direction of slope) on the basis of the two-dimensional heatmap data RXdata.

<Stack Configurations of Position Detection Apparatus 2>

Stack configurations of the position detection apparatus 2 according to the present embodiment will be described with reference to FIGS. 15A and 15B.

Note that the stack configurations described below can be applied not only to the position detection apparatus 2 according to the present embodiment, but also to a position detection apparatus 2A illustrated in FIG. 14 or a position detection apparatus according to a conventional example illustrated in FIG. 20 and the like.

<First Stack Configuration of Position Detection Apparatus 2>

Figure 15A:
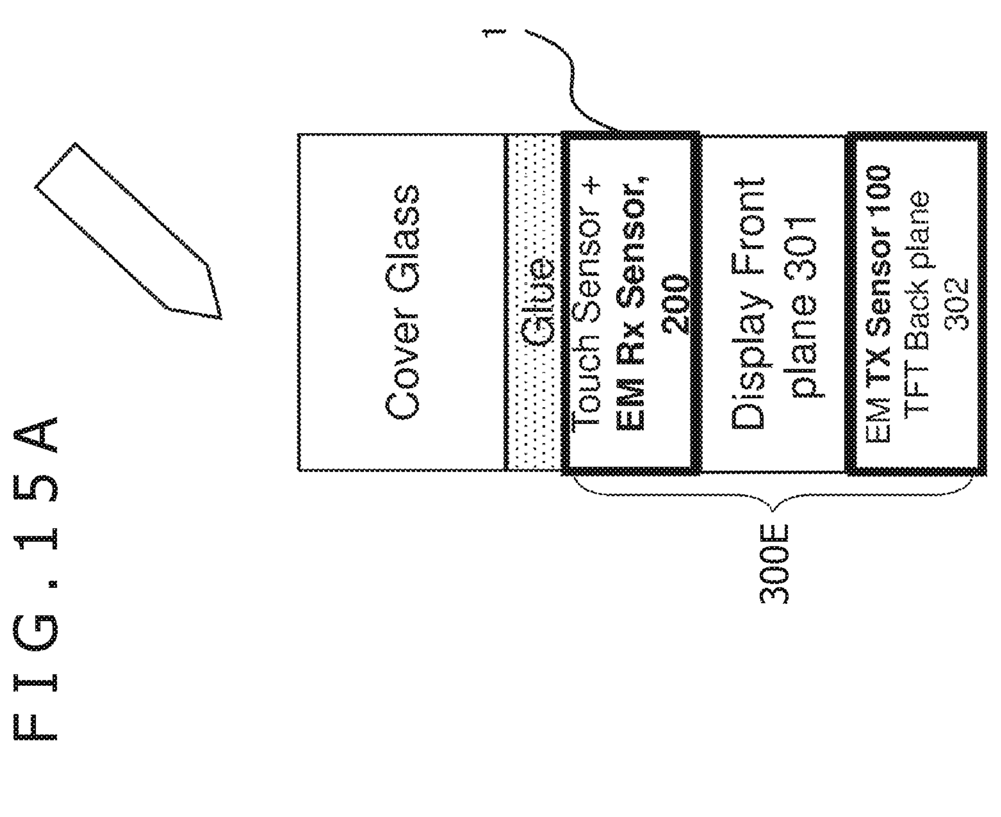
FIG. 15A is a diagram illustrating an example of the stack configuration in which the position detection apparatus, the touch sensor for detecting the finger or the like on the basis of the capacitance (self-capacitance or mutual capacitance) system, and the display apparatus are combined (or incorporated) according to the third embodiment of the present disclosure.

A first stack configuration of the position detection apparatus 2 illustrated in FIG. 15A includes the TX electrode layer (TX sensor coil group 100) including the TX electrodes that generate the alternating magnetic field, a display 300E that controls display pixels and flickering of the display pixels, and the RX electrode layer (RX sensor coil group 200) on the side opposite to the side provided with the TX electrode layer (TX sensor coil group 100) with respect to the display 300E, the RX electrode layer including the plurality of RX electrodes that detect the pen alternating magnetic field generated by the pen that has accumulated the energy through the alternating magnetic field.

That is, the TX electrode layer (TX sensor coil group 100) and the RX electrode layer (RX sensor coil group 200) are provided in different layers separated from each other in the first stack configuration of the position detection apparatus 2 illustrated in FIG. 15A.

As illustrated in FIG. 15A, in the first stack configuration of the position detection apparatus 2, the display 300E includes the TX electrode layer (TX sensor coil group 100) provided in the TFT back plane 302 and the RX electrode layer (RX sensor coil group 200) provided in a layer, on the upper side of the display front plane 301, provided with the on-cell mutual-capacitance touch sensor TS1.

A cover glass is attached to the top of the display 300E through glue or the like.

Note that, in the case of the present configuration, the sensor 1 illustrated in the first embodiment including the integrated capacitance touch sensor and RX electrode layer (RX sensor coil group 200) is provided on the upper side of the display front plane 301.

Note that a magnetic shield plate may be provided on the lower side of the TX electrode layer (TX sensor coil group 100).

<Second Stack Configuration of Position Detection Apparatus 2>

Figure 15B:
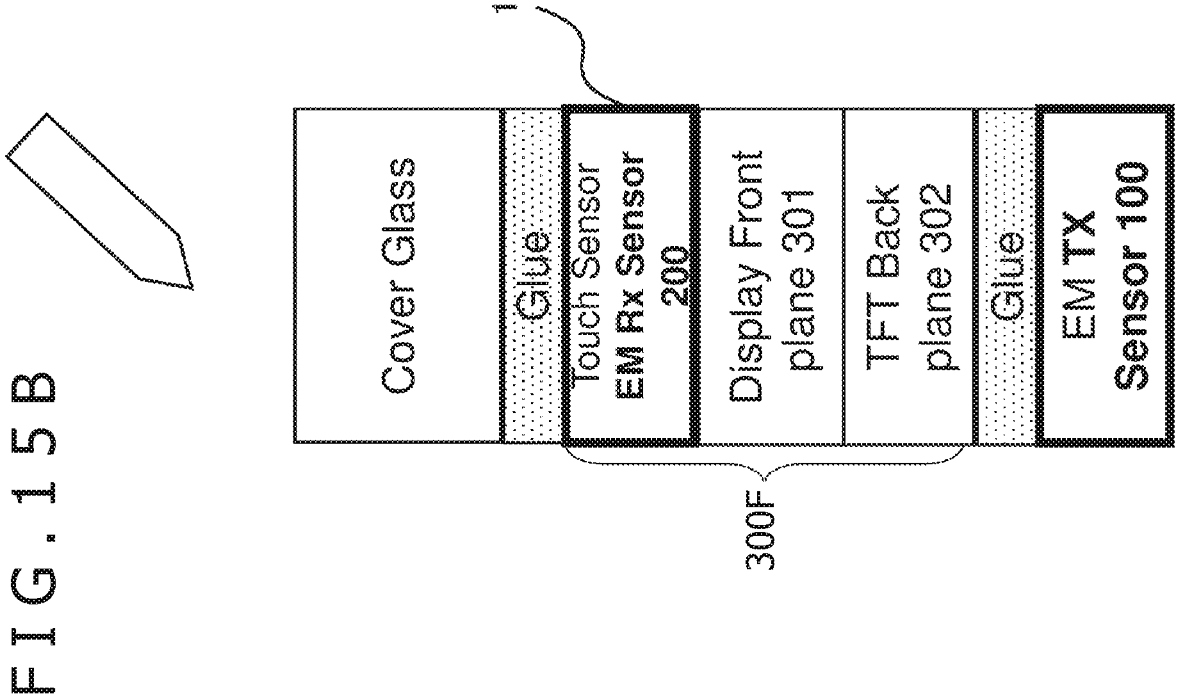
FIG. 15B is a diagram illustrating an example of the stack configuration in which the position detection apparatus, the touch sensor for detecting the finger or the like on the basis of the capacitance (self-capacitance or mutual capacitance) system, and the display apparatus are combined (or incorporated) according to the third embodiment of the present disclosure.

As illustrated in FIG. 15B, in a second stack configuration of the position detection apparatus 2, the TX electrode layer (TX sensor coil group 100) is provided below a display 300F instead of in the TFT back plane 302. The RX electrode layer (RX sensor coil group 200) is provided along with the on-cell mutual-capacitance touch sensor TS1 in a layer, on the upper side of the display front plane 301, provided with the on-cell mutual-capacitance touch sensor (capacitance sensor) TS1, and a cover glass is provided above that.

That is, the TX electrode layer (TX sensor coil group 100) and the RX electrode layer (RX sensor coil group 200) are provided in different layers separated from each other in the second stack configuration of the position detection apparatus 2 illustrated in FIG. 15B.

Note that, in the case of the present configuration, the sensor 1 illustrated in the first embodiment including the integrated on-cell mutual-capacitance touch sensor TS1 and RX electrode layer (RX sensor coil group 200) is provided on the upper side of the display front plane 301.

Note that a magnetic shield plate may be provided on the lower side of the TX electrode layer (TX sensor coil group 100).

<Effects>

The position detection apparatus 2 according to the present embodiment is a position detection apparatus that uses the electromagnetic induction effect to detect the position of the pen. The position detection apparatus 2 includes the TX electrode layer (TX sensor coil group 100) including the TX electrodes that generate the alternating magnetic field, the RX electrode layer (RX sensor coil group 200) including the plurality of RX electrodes that detect the pen alternating magnetic field generated by the pen that has accumulated the energy through the alternating magnetic field, the on-cell mutual-capacitance touch sensor TS1, and the display 300E or 300F that controls the display pixels and the flickering of the display pixels. In the RX electrode layer (RX sensor coil group 200), the floating patterns that are surrounded by the touch electrodes formed by the mesh electrode pattern provided in the on-cell touch layer of the on-cell mutual-capacitance touch sensor and that are adjacent to one another in the extension direction of the RX electrodes are connected to one another by the jumper wires to linearly form the RX electrodes. The TX electrode layer (TX sensor coil group 100) is formed in a layer below the display 300E or 300F.

That is, the TX electrode layer (TX sensor coil group 100) and the RX electrode layer (RX sensor coil group 200) are provided in different layers separated from each other in the position detection apparatus 2 according to the present embodiment.

Further, in the position detection apparatus 2 according to the present embodiment, the RX electrode layer (RX sensor coil group 200) is integrated into the on-cell mutual-capacitance touch sensor TS1.

Therefore, as illustrated in FIG. 15A, the RX electrode layer (RX sensor coil group 200) that operates with a smaller current than the TX electrode layer (TX sensor coil group 100) is integrated into the layer, on the upper side of the display front plane 301, provided with the on-cell mutual-capacitance touch sensor (capacitance sensor) TS1, and the TX electrode layer (TX sensor coil group 100) is integrated into the TFT back plane 302 on the lower side of the display front plane 301.

Therefore, the thickness of the stack structure can be reduced, and the design can be improved, while the performance of the position detection apparatus is maintained without impairing the visibility of the display 300E.

As illustrated in FIG. 15B, in the position detection apparatus 2 according to the present embodiment, the TX electrode layer (TX sensor coil group 100) is provided in the TX electrode layer (TX sensor coil group 100) below the display 300F instead of in the TFT back plane 302. The RX electrode layer (RX sensor coil group 200) is provided along with the on-cell mutual-capacitance touch sensor TS1 in the layer, on the upper side of the display front plane 301, provided with the on-cell mutual-capacitance touch sensor (capacitance sensor) TS1, and the cover glass is provided above that.

That is, the TX electrode layer (TX sensor coil group 100) and the RX electrode layer (RX sensor coil group 200) are provided in different layers separated from each other in the position detection apparatus 2 according to the present embodiment.

Therefore, as illustrated in FIG. 15B, the RX electrode layer (RX sensor coil group 200) that operates with a smaller current than the TX electrode layer (TX sensor coil group 100) is integrated into the layer, on the upper side of the display front plane 301, provided with the on-cell mutual-capacitance touch sensor (capacitance sensor) TS1, and the TX electrode layer (TX sensor coil group 100) is provided below the display 300F. In this way, the thickness of the stack structure can be reduced, and the design can be improved, while the performance of the position detection apparatus is maintained without impairing the visibility of the display 300F.

The position detection apparatus 2 according to the present embodiment includes the TX electrodes 120 to 135 included in the TX sensor coils T0 to T15, respectively, and the connection conductor 130 as a second connection part that mutually connects the TX electrodes 120 to 135. The shape is a comb shape (saw shape).

That is, the position detection apparatus 2 according to the present embodiment controls the switch 11 to, for example, connect a bundle of the TX electrode 125 and the TX electrode 126 to the TX terminals of the TX circuit 10 and connect a bundle of the TX electrode 128 and the TX electrode 129 to the TX_inv terminals of the TX circuit 10.

Also, the TX circuit 10 controls the TX terminals and the TX_inv terminals such that the amounts of change in current are in opposite phases. In this way, the TX circuit 10 can form a stronger transmission magnetic field between the bundle of the TX electrode 125 and the TX electrode 126 and the bundle of the TX electrode 128 and the TX electrode 129 (near the TX electrode 127) than when they are not bundled and than when the potential of TX_inv is fixed.

In other words, by bundling the plurality of TX electrodes, the transmission magnetic field with a desirable strength can be formed even when the TX electrode layer (TX sensor coil group 100) is formed by the TX electrodes that generally have a thin line width and a large impedance.

Fourth Embodiment

A position detection apparatus 3 according to a fourth embodiment will be described with reference to FIGS. 16 and 17.

Note that the configuration of the RX electrode layer (RX sensor coil group 200) is similar to that of the first to third embodiments, and the details will not be described.

<Stack Configuration of Position Detection Apparatus 3>

Figure 16:
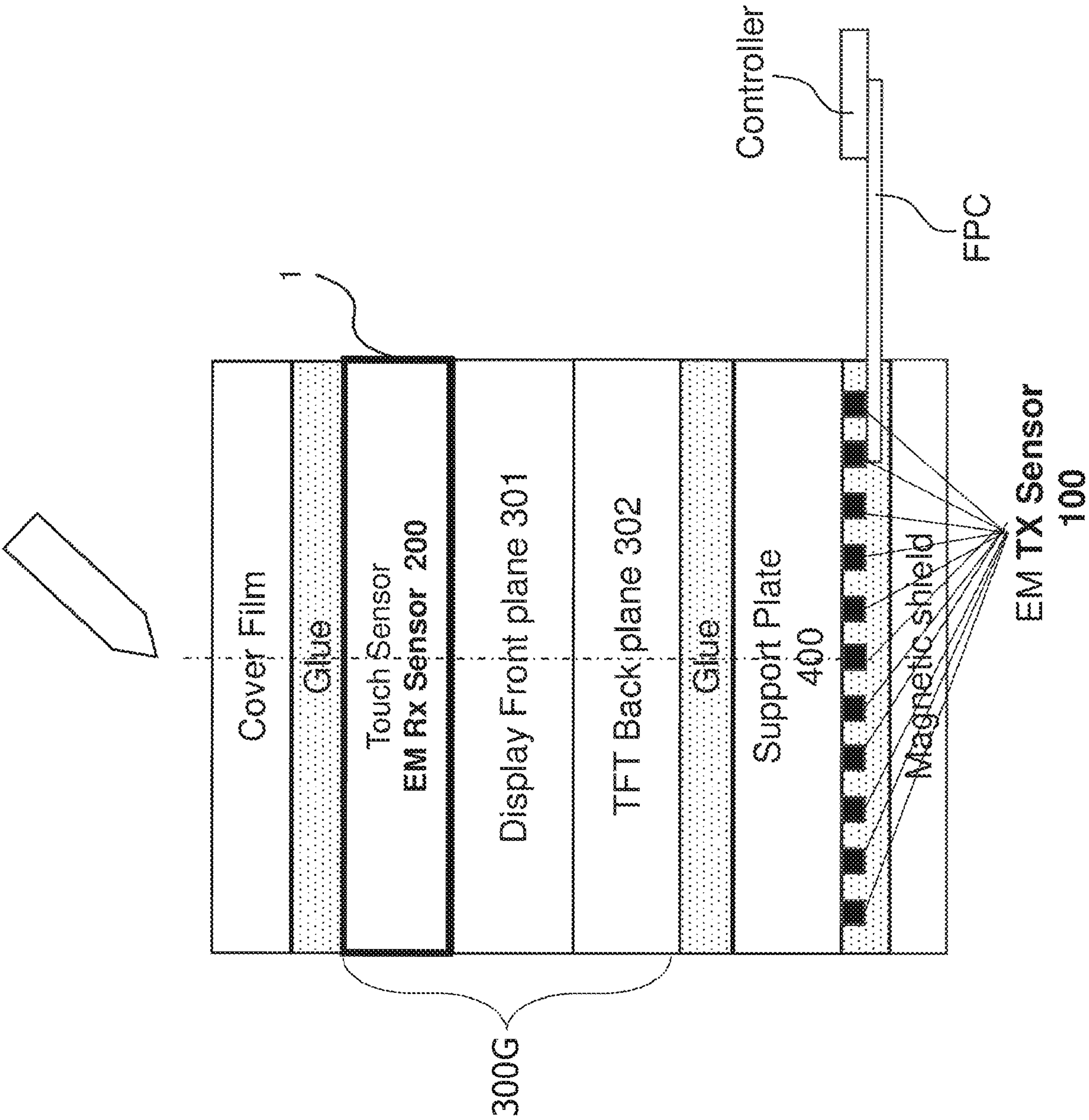
FIG. 16 is a diagram illustrating an example of the stack configuration in which a position detection apparatus, the touch sensor for detecting the finger or the like on the basis of the capacitance (self-capacitance or mutual capacitance)

FIG. 16 illustrates a stack configuration including a flexible display that can be bent at a bending axis indicated by a chain line in FIG. 16, in a direction (valley fold direction) in which the upper surfaces of the cover film approach each other.

As illustrated in FIG. 16, in a first stack configuration of the position detection apparatus 3, a display 300G is what is called the on-cell mutual-capacitance touch sensor TS1 illustrated in the first embodiment. The on-cell mutual-capacitance touch sensor TS1 is provided in the layer on the upper side of the display front plane 301, and the RX electrode layer (RX sensor coil group 200) is integrated into the layer.

That is, the TX electrode layer (TX sensor coil group 100) and the RX electrode layer (RX sensor coil group 200) are provided in different layers separated from each other in the stack configuration of the position detection apparatus 3 illustrated in FIG. 16.

The TX electrode layer (TX sensor coil group 100) is formed on a lower surface of an installed support plate 400 with respect to the pen.

As illustrated in FIG. 16, the TX electrode layer (TX sensor coil group 100) is directly provided on the lower surface of the support plate 400.

Preferably, the support plate 400 contains a material with a low conductivity that does not affect the electromagnetic induction, and the support plate 400 is a rigid substrate such as a glass epoxy substrate (such as flame retardant type 4 (FR4)). The TX electrode layer (TX sensor coil group 100) is provided by printing a conductive material, such as copper and silver, on one surface (upper surface in FIG. 16) of the support plate 400.

Connector terminals of a flexible printed circuit (FPC) are crimped to a pad group of the TX electrode layer (TX sensor coil group 100) to connect it to a controller through the FPC.

A magnetic shield plate may be provided on the lower side of the TX electrode layer (TX sensor coil group 100) as illustrated in FIG. 16.

<Configuration of TX Electrode Layer (TX Sensor Coil Group 100)>

FIG. 17 is a diagram illustrating a configuration example of the TX electrode layer (TX sensor coil group 100).

The configuration of the TX electrode layer (TX sensor coil group 100) illustrated in FIG. 17 is particularly effective when the flexible display that can be bent as in the configuration example of FIG. 16 is used.

In the configuration illustrated in FIG. 17, the TX electrode layer (TX sensor coil group 100) is, for example, printed on the lower surface of the support plate 400 with respect to the pen in FIG. 16.

As illustrated in FIG. 17, the TX electrode layer (TX sensor coil group 100) includes the TX electrodes 120 to 135 included in the TX sensor coils T0 to T15, respectively, and the connection conductor 130 that mutually connects the TX electrodes 120 to 135. The TX electrode layer (TX sensor coil group 100) has a comb shape (saw shape).

As illustrated in FIG. 17, the TX electrodes 120 to 135 are connected to a pad group 140.

The pad group 140 of the TX electrode layer (TX sensor coil group 100) is crimped to the connector terminals of the FPC not illustrated, and pins of the controller corresponding to the terminals are connected to the pad group 140 through the FPC. The controller drives the pad group 140 as TX sensor coils.

<Effects>

As described above, the position detection apparatus 3 according to the present embodiment has the stack configuration including the flexible display that can be bent, and the display 300G is what is called the on-cell mutual-capacitance touch sensor TS1. The on-cell mutual-capacitance touch sensor TS1 is provided in the layer on the upper side of the display front plane 301, and the RX electrode layer (RX sensor coil group 200) is integrated into the layer.

That is, the TX electrode layer (TX sensor coil group 100) and the RX electrode layer (RX sensor coil group 200) are provided in different layers separated from each other in the position detection apparatus 3 according to the present embodiment.

The TX electrode layer (TX sensor coil group 100) is formed on the lower surface of the installed support plate 400 with respect to the pen.

Therefore, the thickness of the stack structure can be reduced, and the design can be improved, while the performance of the position detection apparatus is maintained without losing the visibility of the display 300G.

Further, the TX electrode layer (TX sensor coil group 100) is formed on the lower surface of the installed support plate 400 with respect to the pen, and the connector terminals of the FPC are crimped to the TX electrode layer (TX sensor coil group 100) to connect it to the controller through the FPC.

In other words, the upper surface of the support plate 400 with respect to the pen stays flat. Therefore, even when the display 300G is attached to the top of the support plate 400 through glue or the like, the attachment does not affect the flatness or the slope of the display 300G.

Fifth Embodiment

A position detection apparatus 4 according to a fifth embodiment will be described with reference to FIGS. 18 and 19.

Note that the configuration of the RX electrode layer (RX sensor coil group 200) is similar to that of the first to fourth embodiments, and the details will not be described.

<First Stack Configuration of Position Detection Apparatus 4>

FIG. 18A illustrates a stack configuration including a flexible display in which the support plate is divided.

As in the fourth embodiment, the display 300G is what is called the on-cell mutual-capacitance touch sensor TS1. The on-cell mutual-capacitance touch sensor TS1 is provided in the layer on the upper side of the display front plane 301, and the RX electrode layer (RX sensor coil group 200) is integrated into the layer.

That is, the TX electrode layer (TX sensor coil group 100) and the RX electrode layer (RX sensor coil group 200) are provided in different layers separated from each other in a first stack configuration of the position detection apparatus 4 illustrated in FIG. 18A.

The TX electrode layer (TX sensor coil group 100) is formed on upper surfaces of installed support plates 400-1 and 400-2 with respect to the pen.

In the configuration of FIG. 18A, a TX electrode layer (TX sensor coil group 100-1) is directly provided on the upper surface of the first support plate 400-1, and a TX electrode layer (TX sensor coil group 100-2) is directly provided on the upper surface of the second support plate 400-2.

Preferably, the support plates 400-1 and 400-2 are rigid substrates such as glass epoxy substrates (such as FR4). The TX electrode layer (TX sensor coil group 100-1) and the TX electrode layer (TX sensor coil group 100-2) are provided by printing a conductive material, such as copper and silver, on one surfaces (upper surfaces in FIG. 16A) of the first support plate 400-1 and the second support plate 400-2.

Further, pad groups or some of the TX sensor coil wires connected through vias to the TX electrode layer (TX sensor coil group 100-1 and TX sensor coil group 100-2) formed on the upper surfaces of the first support plate 400-1 and the second support plate 400-2 are printed on the lower side of the first support plate 400-1 and the second support plate 400-2, and they are crimped to connector terminals connected to a flexible substrate.

Note that, as illustrated in FIG. 18A, a magnetic shield plate may be provided on the lower side of the first support plate 400-1 and the second support plate 400-2 provided with the TX electrode layer (TX sensor coil group 100-1) and the TX electrode layer (TX sensor coil group 100-2).

<Second Stack Configuration of Position Detection Apparatus 4>

In a configuration of FIG. 18B, the TX electrode layer (TX sensor coil group 100-1) and the TX electrode layer (TX sensor coil group 100-2) are directly provided on the respective lower surfaces of the divided first support plate 400-1 and second support plate 400-2, unlike in the configuration of FIG. 18A.

That is, the TX electrode layer (TX sensor coil group 100) and the RX electrode layer (RX sensor coil group 200) are provided in different layers separated from each other in a second stack configuration of the position detection apparatus 4 illustrated in FIG. 18B.

The connector terminals of the FPC are crimped to the TX electrode layer (TX sensor coil group 100-1) and the TX electrode layer (TX sensor coil group 100-2) to connect them to the controller through the FPC.

Note that a magnetic shield plate may be provided on the lower side of the TX electrode layer (TX sensor coil group 100-1) and the TX electrode layer (TX sensor coil group 100-2) as illustrated in FIG. 18B.

<Configuration of TX Electrode Layer (TX Sensor Coil Group 100)>

FIG. 19 is a diagram illustrating a configuration example of the TX electrode layer (TX sensor coil groups 100-1 and 100-2).

The configuration of the TX electrode layer (TX sensor coil groups 100 and 100-2) illustrated in FIG. 19 is particularly effective when the flexible display that can be bent as in the configuration examples of FIGS. 18A and 18B is used.

In the configuration illustrated in FIG. 19, the support plate 400 is divided, and the TX electrode layer is formed on the upper surfaces or the lower surfaces of the divided support plates 400-1 and 400-2 in FIG. 18A or 18B with respect to the pen, for example.

Specifically, the X electrode layer (TX sensor coil group 100) in the configuration of FIG. 19 includes a first TX electrode layer (TX sensor coil group 100-1) printed on the support plate 400-1 of FIG. 18A or 18B and a second TX electrode layer (TX sensor coil group 100-2) printed on the support plate 400-2.

As illustrated in FIG. 18B, pad groups 140-1 and 140-2 are printed on the lower side of the support plate 400-2 and crimped to the connector terminals connected to the flexible substrate, for example.

Note that a bending part 400-3 that is a flexible member or structure may be provided between the support plate 400-1 and the support plate 400-2, and a bending waist connection conductor 131 may be provided on the part, the bending waist connection conductor 131 containing a material and a structure unlikely to be disconnected in the bending operation compared to the connection conductor 130 that is another first connection part.

As illustrated in FIG. 19, the TX electrode layer (TX sensor coil group 100) includes the TX electrodes 120 to 135 included in the TX sensor coils T0 to T15, respectively, and the connection conductor 130 that mutually connects the TX electrodes 120 to 135. The TX electrode layer (TX sensor coil group 100) has a comb shape (saw shape).

As illustrated in FIG. 19, the TX electrodes 120 to 127 are connected to the first pad group 140-1, and the TX electrodes 128 to 135 are connected to the second pad group 140-2.

The pad group 140 of the TX electrode layer (TX sensor coil group 100) is crimped to the connector terminals of the FPC not illustrated, and the pins of the controller corresponding to the terminals are connected to the pad group 140 through the FPC. The controller drives the pad group 140 as TX sensor coils.

<Effects>

The position detection apparatus 4 according to the present embodiment has the stack configuration including the flexible display that can be bent, and the display 300G is what is called the on-cell mutual-capacitance touch sensor TS1. The on-cell mutual-capacitance touch sensor TS1 is provided in the layer on the upper side of the display front plane 301, and the RX electrode layer (RX sensor coil group 200) is integrated into the layer.

Meanwhile, the TX electrode layer (TX sensor coil group 100-1) and the TX electrode layer (TX sensor coil group 100-2) are directly provided on the respective lower surfaces of the divided first support plate 400-1 and second support plate 400-2.

That is, the TX electrode layer (TX sensor coil group 100) and the RX electrode layer (RX sensor coil group 200) are provided in different layers separated from each other in the second stack configuration of the position detection apparatus 4.

Therefore, the thickness of the stack structure can be reduced, and the design can be improved, while the performance of the position detection apparatus is maintained without losing the visibility of the display 300G.

In addition, the TX electrode layer (TX sensor coil groups 100-1 and 100-2) is formed on the lower surfaces of the installed first support plate 400-1 and second support plate 400-2 with respect to the pen.

Further, the pad groups 140-1 and 140-2 are printed on the lower side of the support plate 400-2 and crimped to the connection terminals connected to the flexible substrate.

Therefore, the flatness of the upper surfaces of the first support plate 400-1 and the second support plate 400-2 is maintained as much as possible in the structure, and even when the display 300G is attached to the top of the first support plate 400-1 and the second support plate 400-2 through glue or the like, the attachment is unlikely to affect the flatness or the slope of the display 300G.

The position detection apparatus 4 according to the present embodiment has the stack configuration including the flexible display that can be bent, and a display 300J is what is called the on-cell mutual-capacitance touch sensor TS1. The on-cell mutual-capacitance touch sensor TS1 is provided in the layer on the upper side of the display front plane 301, and the RX electrode layer (RX sensor coil group 200) is also provided in the layer.

Meanwhile, the TX electrode layer (TX sensor coil group 100-1) and the TX electrode layer (TX sensor coil group 100-2) are directly provided on the respective lower surfaces of the divided first support plate 400-1 and second support plate 400-2.

That is, the TX electrode layer (TX sensor coil group 100) and the RX electrode layer (RX sensor coil group 200) are provided in different layers separated from each other in the second stack configuration of the position detection apparatus 4.

Further, the connector terminals of the FPC are crimped to the TX electrode layer (TX sensor coil group 100-1) and the TX electrode layer (TX sensor coil group 100-2) to connect them to the controller through the FPC.

Therefore, the thickness of the stack structure can be reduced, and the design can be improved, while the performance of the position detection apparatus is maintained without losing the visibility of the display 300J.

Also, the TX electrode layer (TX sensor coil group 100-1 and TX sensor coil group 100-2) is formed on the lower surfaces of the installed first support plate 400-1 and second support plate 400-2 with respect to the pen, and the connector terminals of the FPC are crimped to the TX electrode layer (TX sensor coil group 100-1 and TX sensor coil group 100-2) to connect them to the controller through the FPC.

In other words, the upper surface of the first support plate 400-1 and the second support plate 400-2 with respect to the pen stays flat. Therefore, even when the display 300J is attached to the top of the first support plate 400-1 and the second support plate 400-2 through glue or the like, the attachment does not affect the flatness or the slope of the display 300J.

In the TX electrode layer (TX sensor coil group 100) of the position detection apparatus 4 according to the present embodiment, the support plate 400 is divided, and the TX electrode layer is formed on the upper surfaces or the lower surfaces of the divided support plates 400-1 and 400-2 with respect to the pen.

Specifically, the TX electrode layer (TX sensor coil group 100) has the configuration of FIG. 19, and the TX electrode layer (TX sensor coil group 100) includes the first TX electrode layer (TX sensor coil group 100-1) printed on the support plate 400-1 of FIGS. 18A and 18B and the second TX electrode layer (TX sensor coil group 100-2) printed on the support plate 400-2.

In addition, the TX electrode layer (TX sensor coil group 100) of the position detection apparatus 4 according to the present embodiment includes the TX electrodes 120 to 135 included in the TX sensor coils T0 to T15, respectively, and the connection conductor 130 as a second connection part that mutually connects the TX electrodes 120 to 135. The TX electrode layer (TX sensor coil group 100) has a comb shape (saw shape).

That is, in the TX electrode layer (TX sensor coil group 100) of the position detection apparatus 4 according to the present embodiment, the switch 11 is controlled to, for example, connect a bundle of the TX electrode 125 and the TX electrode 126 to the TX terminals of the TX circuit 10 and connect a bundle of the TX electrode 128 and the TX electrode 129 to the TX_inv terminals of the TX circuit 10.

Further, the TX circuit 10 controls the TX terminals and the TX_inv terminals such that the amounts of change in current are in opposite phases. In this way, the TX circuit 10 can form a stronger transmission magnetic field between the bundle of the TX electrode 125 and the TX electrode 126 and the bundle of the TX electrode 128 and the TX electrode 129 (near the TX electrode 127) than when they are not bundled and than when the potential of TX_inv is fixed.

In other words, by bundling the plurality of TX electrodes, the transmission magnetic field with a desirable strength can be formed even when the TX electrode layer (TX sensor coil group 100) is formed by the TX electrodes with a thin line width and a large impedance.

First Modification

Although the RX electrode layer (RX sensor coil group 200) is integrated into the on-cell mutual-capacitance touch sensor TS1 in the sensor 1 illustrated in the first embodiment, the first sensor electrodes (touch panel TX electrodes) 210 may be used as the TX electrode layer (TX sensor coil group 100) for performing the pen detection on the basis of the electromagnetic induction system, during the pen detection based on the electromagnetic induction system. In this way, the RX electrode layer (RX sensor coil group 200) may substantially be integrated into the on-cell mutual-capacitance touch sensor TS1 in the sensor, and the RX electrode layer (RX sensor coil group 200) may be formed in a different layer.

Second Modification

In the above embodiments, the TX electrodes are electrodes for transmitting the magnetic field, and the RX electrodes are electrodes for detecting the pen signal. In this way, the functions are uniquely set to facilitate the understanding of the description. However, the TX electrodes may first operate as TX electrodes for transmitting the magnetic field in time division and then operate as RX electrodes for detecting the pen signal of another axis (for example, Y-axis) different from the array axis (for example, X-axis) of the RX electrodes for detecting the pen signal.

Further, the TX electrodes in the above embodiments may be referred to as first electrodes arranged together in a first direction, and the RX electrodes may be referred to as second electrodes arranged together in a second direction.

Note that the process of the TX circuit 10 and the like can be recorded in a recording medium that can be read by a computer system, and the TX circuit 10 and the like can read and execute the program recorded in the recording medium to realize the sensor 1, the sensor 1A, and the position detection apparatuses 2 to 4 of the present disclosure. The computer system here includes hardware such as an operating system (OS) and a peripheral apparatus.

The "computer system" also includes a website providing environment (or displaying environment) when the world wide web (WWW) system is used. The program may be transmitted from the computer system including the program stored in a storage device or the like to another computer system through a transmission medium or a transmission wave in the transmission medium. The "transmission medium" that transmits the program is a medium with a function of transmitting information, such as a network (communication network) like the Internet and a communication line like a telephone line.

The above program may be a program for implementing some of the functions described above. Further, the program may be what is called a differential file (differential program) that can implement the above functions in combination with a program already recorded in the computer system.

Although the embodiments of the disclosure have been described in detail with reference to the drawings, the specific configurations are not limited to the embodiments, and the specific configurations also include the design and the like within the scope of the disclosure.

What is claimed is:

1. A sensor, comprising:

an on-cell mutual-capacitance touch sensor; and an electromagnetic induction sensor, wherein a first electrode group included in the on-cell mutual-capacitance touch sensor and a second electrode group included in the electromagnetic induction sensor are provided in three or fewer layers including at least a layer with a mix of part of the first electrode group and part of the second electrode group.

2. The sensor according to claim 1, comprising at least:

a first layer including the first electrode group included in the on-cell mutual-capacitance touch sensor;

a second layer including auxiliary wires connecting some of electrodes of the first electrode group to one another and some of electrodes of the second electrode group included in the electromagnetic induction sensor; and a third layer including some other of the electrodes of the second electrode group included in the electromagnetic induction sensor.

3. The sensor according to claim 2, wherein the auxiliary wires include jumper wires or bridge wires.

4. The sensor according to claim 1, comprising:

a shared layer shared by an electrode group extending in a first direction of the on-cell mutual-capacitance touch sensor and some of electrodes of the second electrode group that generate an alternating magnetic field for detecting a position of a pen in the electromagnetic induction sensor; and a mixed layer in which some other of the electrodes of the second electrode group that detect a pen alternating magnetic field, the pen alternating magnetic field being generated by the pen that has accumulated energy through the alternating magnetic field from the some of the electrodes of the second electrode group, and an electrode group extending in a second direction crossing the first direction of the on-cell mutual-capacitance touch sensor are connected to one another through auxiliary wires.

5. The sensor according to claim 4, wherein the auxiliary wires include jumper wires or bridge wires.

6. The sensor according to claim 5, wherein a shape of a coil group including the some other of the electrodes of the second electrode group connected by the auxiliary wires is a comb shape.

7. The sensor according to claim 6, wherein sensor electrodes of the on-cell mutual-capacitance touch sensor include floating patterns and peripheral parts surrounding the floating patterns from outside, and a linear coil group including the floating patterns from an open end side to a finish end side of the comb-shaped coil group and the auxiliary wires is arranged not to overlap, in plan view, a linear coil group including the peripheral parts extending in the second direction crossing the first direction of the on-cell mutual-capacitance touch sensor and the auxiliary wires.

8. The sensor according to claim 7, wherein the peripheral parts of the sensor electrodes adjacent to each other in the first direction are connected to each other by a plurality of wires or a connection part including a wide wire, and in the some other of the electrodes of the second electrode group, the floating patterns of the sensor electrodes adjacent to each other in an extension direction are connected to each other by the plurality of auxiliary wires.

9. The sensor according to claim 8, wherein a plurality of wires are added to the floating patterns or the peripheral parts of the floating patterns in the sensor electrodes.

* * * * *